United States Patent
Royak et al.

(10) Patent No.: US 9,800,190 B2
(45) Date of Patent: Oct. 24, 2017

(54) CONTROL OF MOTOR DRIVES WITH OUTPUT SINEWAVE FILTER CAPACITOR CURRENT COMPENSATION USING SINEWAVE FILTER TRANSFER FUNCTION

(71) Applicant: Rockwell Automation Technologies, Inc., Mayfield Heights, OH (US)

(72) Inventors: Semyon Royak, Orange Village, OH (US); Jingbo Liu, Grafton, WI (US); Jingya Dai, Burnaby (CA); Thomas Nondahl, Greenfield, WI (US); Ehsan Al-Nabi, Cambridge (CA); Peter B. Schmidt, Franklin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 15/014,360

(22) Filed: Feb. 3, 2016

(65) Prior Publication Data
US 2017/0222588 A1   Aug. 3, 2017

(51) Int. Cl.
| H02M 1/15 | (2006.01) |
| H02M 7/72 | (2006.01) |
| H02M 5/40 | (2006.01) |
| H02P 23/14 | (2006.01) |
| H02P 27/06 | (2006.01) |

(52) U.S. Cl.
CPC .............. *H02P 23/14* (2013.01); *H02P 27/06* (2013.01)

(58) Field of Classification Search
CPC ................................. H02M 1/12; H02M 7/487
See application file for complete search history.

(56) References Cited

U.S. PATENT DOCUMENTS

| 3,723,840 A | 3/1973 | Opal et al. |
| 4,823,251 A | 4/1989 | Kawabata et al. |
| (Continued) |

FOREIGN PATENT DOCUMENTS

| CN | 2513286 Y | 9/2002 |
| CN | 101383585 A | 3/2009 |
| (Continued) |

OTHER PUBLICATIONS

"Guidelines for the Use of 400-600 Volt AC Drives in Medium Voltage Applications," Yaskawa Application Note, Jun. 7, 2005.
(Continued)

*Primary Examiner* — Eduardo Colon Santana
*Assistant Examiner* — Charles A Laughlin
(74) *Attorney, Agent, or Firm* — Fay Sharpe LLP

(57) ABSTRACT

Disclosed examples include power conversion systems, methods and computer readable mediums to operate an inverter to drive a motor load through an intervening filter, by computing a speed error value according to a speed reference value and a speed feedback value, computing a torque reference value according to the speed error value, computing a motor current reference value according to the torque reference value, compensating the motor current reference value according to capacitor currents of the output filter using a transfer function representing an output current to input current amplitude vs. frequency behavior of the output filter and the motor load, and controlling the inverter according to the inverter output current reference value.

14 Claims, 10 Drawing Sheets

(56) References Cited

U.S. PATENT DOCUMENTS

| | | |
|---|---|---|
| 5,032,771 A | 7/1991 | Kerkman |
| 5,526,252 A | 6/1996 | Erdman |
| 5,703,449 A | 12/1997 | Nagate |
| 5,717,305 A | 2/1998 | Seibel |
| 5,744,921 A | 4/1998 | Makaran |
| 5,909,098 A | 6/1999 | Konecny et al. |
| 5,959,431 A | 9/1999 | Xiang |
| 5,990,654 A | 11/1999 | Skibinski et al. |
| 5,994,869 A | 11/1999 | Bacerra |
| 6,121,736 A | 9/2000 | Narazaki et al. |
| 6,124,697 A | 9/2000 | Wilkerson |
| 6,208,537 B1 | 3/2001 | Skibinski et al. |
| 6,222,335 B1 | 4/2001 | Hiti et al. |
| 6,329,781 B1 | 12/2001 | Matsui et al. |
| 6,600,980 B1 | 7/2003 | Kraska et al. |
| 6,940,249 B2 | 9/2005 | Toyoda |
| 6,965,212 B1 | 11/2005 | Wang et al. |
| 7,045,988 B2 | 5/2006 | Ha et al. |
| 7,049,778 B2 | 5/2006 | Katanaya |
| 7,084,604 B2 | 8/2006 | Salomaki |
| 7,102,323 B2 | 9/2006 | Zhou et al. |
| 7,468,595 B2 | 12/2008 | Lee |
| 7,679,308 B2 | 3/2010 | Tomigashi |
| 7,683,568 B2 | 3/2010 | Pande et al. |
| 7,724,549 B2 | 5/2010 | Skibinski et al. |
| 7,729,146 B2 | 6/2010 | Hayami et al. |
| 7,932,693 B2 | 4/2011 | Lee |
| 7,979,223 B2 | 7/2011 | Monti et al. |
| 7,990,097 B2 | 8/2011 | Cheng et al. |
| 8,009,450 B2 | 8/2011 | Royak et al. |
| 8,143,838 B2 | 3/2012 | Akiyama |
| 8,217,602 B2 | 7/2012 | Ikei |
| 8,232,760 B2 | 7/2012 | Lu et al. |
| 8,288,886 B2 | 10/2012 | Anwar et al. |
| 8,299,646 B2 | 10/2012 | Rockenfeller et al. |
| 8,350,507 B2 | 1/2013 | Ito |
| 8,541,971 B2 | 9/2013 | Sakai |
| 8,736,220 B2 | 5/2014 | Ogawa et al. |
| 8,890,450 B2 | 11/2014 | Maekawa |
| 8,970,154 B2 | 3/2015 | Ishikawa et al. |
| 8,981,702 B2 | 3/2015 | Katariya et al. |
| 9,054,611 B2 | 6/2015 | Liu et al. |
| 9,054,621 B2 | 6/2015 | Liu et al. |
| 9,124,209 B2 | 9/2015 | Liu et al. |
| 2004/0052097 A1 | 3/2004 | Morimoto |
| 2006/0113952 A1 | 6/2006 | Zhou |
| 2007/0001635 A1 | 1/2007 | Ho |
| 2007/0007929 A1 | 1/2007 | Lee et al. |
| 2008/0001571 A1 | 1/2008 | Tomigashi |
| 2008/0074074 A1 | 3/2008 | Skibinski et al. |
| 2008/0312855 A1 | 12/2008 | Monti et al. |
| 2009/0146592 A1 | 6/2009 | Tobari et al. |
| 2009/0153083 A1 | 6/2009 | Rozman |
| 2009/0200980 A1 | 8/2009 | Ramu et al. |
| 2011/0062908 A1 | 3/2011 | Kitanaka |
| 2011/0084638 A1 | 4/2011 | Patel et al. |
| 2011/0106470 A1* | 5/2011 | Yin .................. H02J 3/01 702/58 |
| 2011/0109155 A1 | 5/2011 | Anwar et al. |
| 2011/0181232 A1 | 7/2011 | Krishnamoorthy et al. |
| 2012/0038300 A1 | 2/2012 | Kato et al. |
| 2012/0268056 A1* | 10/2012 | Liu .................. H02P 27/045 318/808 |
| 2013/0153180 A1 | 6/2013 | Montocchio et al. |
| 2014/0197774 A1* | 7/2014 | Liu .................. H02M 1/126 318/721 |
| 2014/0228980 A1 | 8/2014 | Ohta et al. |
| 2014/0312811 A1* | 10/2014 | Liu .................. H02P 21/0003 318/400.2 |
| 2015/0002059 A1* | 1/2015 | Liu .................. H02P 6/08 318/400.04 |
| 2015/0002067 A1 | 1/2015 | Rowan et al. |
| 2015/0123579 A1 | 5/2015 | Liu et al. |

FOREIGN PATENT DOCUMENTS

| | | |
|---|---|---|
| CN | 201504207 U | 6/2010 |
| CN | 101950983 A | 1/2011 |
| CN | 102045021 A | 5/2011 |
| CN | 102349230 A | 2/2012 |
| CN | 202872721 U | 4/2013 |
| CN | 103190068 A | 7/2013 |
| EP | 1635448 A1 | 3/2006 |
| EP | 1868288 A1 | 12/2007 |
| GB | 2390766 A | 1/2004 |
| JP | 2001-025282 | 1/2001 |
| JP | 2002034289 A | 1/2002 |
| WO | WO2009093214 A2 | 7/2009 |

OTHER PUBLICATIONS

Agarlita, Sorin-Cristian et al., "I-f Starting and Active Flux Based Sensorless Vector Control of Reluctance Synchronous Motors, with Experiments", $12^{th}$ Int'l Conf. on Optimization of Electrical and Electronic Equipment, OPTIM 2010, pp. 337-342.

Andreescu, G., et al. "Stable V/f Control System with Unity Power Factor for PMSM Drives", IEEE $13^{th}$ Int'l Conf. on Optimization of Electrical and Electronic Equipment (OPTIM), May 2012, pp. 432-438.

Batzel, Todd D. et al., *"Electric Propulsion With Sensorless Permanent Magnet Synchronous Motor: Implementation and Performance"*, IEEE Transactions on Energy Conversion, vol. 20, No.3, pp. 575-583, Sep. 2005.

Carpaneto, et al., "A New Sensorless Permanent Magnet Synchronous Motor Algorithm Based on Algebraic Method"; $13^{th}$ European Conf. on Power Electronics and Applications, 2009; EPE 2009; Sep. 8-10, 2009, Barcelona, Spain; IEEE, Piscataway, NJ, Sep. 8, 2009, pp. 1-10.

Colby, Roy S., "An Efficiency-Optimizing Permanent-Magnet Synchronous Motor Drive", IEEE Transactions on Industry Applications, vol. 24, No. 3, May/Jun. 1998, pp. 462-469.

Fatu et al., I-F Starting Method With Smooth Transition to EMF Based Motion-Sensorless Vector Control of PM Synchronous Motor/Generator, 2008, IEEE, pp. 1481-1487.

Halkassari, Optimal U/F-Control of High Speed Permanent Magnet Motors, 2006, IEEE, pp. 2302-2308.

Iepure, Liviu Ioan et al., "Hybrid I-f Starting and Observer-Based Sensorless Control of Single-Phase BLDC-PM Motor Drives", IEEE Transactions on Industrial Electronics, vol. 59, No. 9, Sep. 2012, pp. 3436-3444.

J. Liu et al., "Rotor Position Estimation for Synchronous Machines Based on Equivalent EMF", IEEE Transactions on Industry Applications, vol. 47, pp. 1310-1318, May-Jun. 2011.

Jaitrong et al., "A Modify Technique to Actively Damp Oscillation in the Input LC Filter of Three-Phase PWM Rectifier", Electrical Engineering/Electronics, Computer, Telecommunications and Information Technology, 2008; Proceedings of ECTI-CON 2008; pp. 1017-1020.

Kim et al., "PWM Switching Frequency Signal Injection Sensorless Methods in IPMSM", IEEE, 2011, pp. 3021-3028.

Muchi, M., et al., "V/f Control of Permanent Magnet Synchronous Motors Suitable for Home Appliances by DC-link Peak Current Control Method", The Jun. 2010 Int'l Power Electronics Conference, IEEE 2010, pp. 567-573.

Kobayashi et al., "Investigation of IPMSM's Position Estimation in Low Speed Region with DC Link Current Detection", IEEE Jan. 2007, pp. 1411-1416.

Kojima, Mari et al., *"Novel Vector Control System Using Deadbeat-Controlled PWM Inverter With Output LC Filter"*, IEEE Transactions on Industry Applications, vol. 40, No. 1, pp. 162-169, Jan./Feb. 2004.

Kubota et al., "Sensorless Vector Control of Closed-Slot Induction Machines at Low Frequency", IEEJ Journal of Industry Applications, vol. 2, No. 1, The Institute of Electrical Engineers of Japan, 2013, pp. 74-78.

(56) References Cited

OTHER PUBLICATIONS

Kukrer, "Deadbeat Control of a Three-Phase Inverter with an Output LC Filter", IEEE Transactions on Power Electronics, vol. 11, No. 1, Jan. 1996, 8 pgs.

Laczynski et al., "Active Damping of LC-Filters for High Power Drives Using Synchronous Optimal Pulsewidth Modulation", Power Electronics Specialists Conf., IEEE, Jun. 15, 2008, pp. 1033-1040.

Loh, Poh Chiang et al., "*Analysis of Multiloop Control Strategies for LC/CL/LCL-Filtered Voltage-Source and Current-Source Inverters*", IEEE Transactions on Industry Applications, vol. 41, No. 2, pp. 644-654, Mar./Apr. 2005.

Makridenko, L.A. et al., "Sensorless Drive With Synchronous Machine and Submersible Inverter for Oil-Drowned Pump", IEEE European Conf. on Power Electronics and Applications (EPE), pp. 1-10, Sep. 2009.

Matsushita, M., et al., "Stabilization Control of Sensorless Sinusoidal Wave Drive for Control of Power Factor of PM Motor", IEEE Int'l Conf. Electrical Machines and Systems (ICEMS), 2009, 5 pgs.

Miranda et al., "Parameter and Speed Estimation for Implementing Low Speed Sensorless PMSM Drive System Based on an Algebraic Method"; Applied Power Electronics Conf.; APEC 2007, $22^{nd}$ Annual IEEE; Feb. 1, 2007,;pp. 1406-1410.

Miranda et al., "Sensorless Control of a PMSM Synchronous Motor at Low Speed"; IEEE Industrial Electronics; IECON 2006; $32^{nd}$ Annual Conf., IEEE; Piscataway, NJ; Nov. 1, 2006; pp. 5069-5074.

Moldovan et al., "Active-Flux Based, V/f-With-Stabilizing-Loops Versus Sensorless Vector Control of IPMSM Drives"; Industrial Electronics (ISLE); 2011 IEEE Int'l Symposium; Jun. 27, 2011; pp. 514-519.

Mukherjee et al., "Fast Control of Filter for Sensorless Vector Control SQIM Drive With Sinusoidal Motor Voltage", IEEE Transactions on Industrial Electronics, vol. 54, No. 5, Oct. 2007, pp. 2435-2442.

Nakamura, Yoshinobu et al., "High-Efficiency Drive Due to Power Factor Control of a Permanent Magnet Synchronous Motor", IEEE Transactions on Power Electronics, vol. 10, No. 2, Mar. 1995, Manuscript rec'd Aug. 22, 1992, revised Sep. 13, 1994, pp. 247-253.

Park et al., "Analysis and Reduction of Time Harmonic Rotor Loss in Solid-Rotor Synchronous Reluctance Drive", IEEE Transactions on Power Electronics, vol. 23, No. 2, Mar. 1, 2008, pp. 985-992.

Park et al., "Design and Control of High-Speed Solid-Rotor Synchronous Reluctance Drive With Three-Phase LC Filter", Conference Record of the 2005 IEEE Industry Applications Conf. $40^{th}$ IAS Annual Meeting, vol. 1, Oct. 2, 2005, pp. 715-722.

Perera, P.D. Chandana, "A Sensorless, Stable V/f Control Method for Permanent-Magnet Synchronous Motor Drives", IEEE Transactions on Industry Applications, vol. 39, No. 3, May/Jun. 2003, IEEE 2003, pp. 783-791.

Ryvkin, S. et al., "Sensorless Oil Drowned Pump Drive", IEEE ISIE 2005, Jun. 20-23, 2005, Dubrovnik, Croatia, pp. 963-968.

Salomäki, J. et al., "*Sensorless Control of Induction Motor Drives Equipped With Inverter Output Filter*", IEEE Transactions on Industrial Electronics, vol. 53, No. 4, pp. 1188-1197, Aug. 2006.

Salomäki, J. et al., "*Sensorless Vector Control of PMSM Drives Equipped With Inverter Output Filter*", in Proceedings of the $32^{nd}$ Annual Conference of the IEEE Industrial Electronics Society (IECON 2006), Paris, France, pp. 1059-1064.

Steinke et al., "Use of a LC Filter to Achieve a Motorfriendly Performance of the PWM Voltage Source Inverter", Electric Machines and Drives Conference Record, 1997; IEEE, Milwaukee, WI, May 18, 1997, 3 pgs.

Stirban et al., "Motion-Sensorless Control of BLDC-PM Motor With Offline Fem-Information-Assisted Position and Speed Observer"; IEEE Transactions on Industry Applications; IEEE Service Center, Piscataway, NJ; vol. 48, No. 6; Nov. 1, 2012; pp. 1950-1958.

Yaskawa Technical Review, vol. 69, No. 2, AC Drive Drive, Sensorless Drive Technology for Permanent Magnet Synchronous Motor; http://www.yaskawa.co.jp/en/technology/tech_news/69-2/t10.htm, retrieved from the Internet 11-26-2-14, 1 pg.

Yim et al., "A Predictive Current Control Associated to EKF for High Performance IPMSM Drives"; Applied Power Electronics Conf. and Exposition (APEC), 2011; $26^{th}$ Annual IEEE, Mar. 6, 2011; pp. 1010-1016.

Stirban et al., "Motion-Sensorless Control of BLDC-PM Motor With Offline FEM Information Assisted State Observer"; Optimization of Electrical and Electronic Equipment (OPTIM), 2010 $12^{th}$ International Conference, May 22, 2010, pp. 321-328.

U.S. Appl. No. 14/555,769, filed Nov. 28, 2014.
U.S. Appl. No. 14/193,329, filed Feb. 28, 2014.
U.S. Appl. No. 14/565,781, filed Dec. 10, 2014.
U.S. Appl. No. 14/625,860, filed Feb. 19, 2015.
U.S. Appl. No. 14/607,505, filed Jan. 28, 2015.
U.S. Appl. No. 14/666,894, filed Mar. 24, 2015.
U.S. Appl. No. 14/971,221, filed Dec. 16, 2015.

* cited by examiner

CONTROL OF MOTOR DRIVES WITH OUTPUT SINEWAVE FILTER CAPACITOR CURRENT COMPENSATION USING SINEWAVE FILTER TRANSFER FUNCTION

INCORPORATION BY REFERENCE

The following U.S. patents, patent applications and published patent applications are hereby incorporated by reference in their entireties: U.S. Pat. No. 9,124,209 issued Sep. 1, 2015 to Liu et al., entitled METHOD AND APPARATUS FOR CONTROLLING POWER CONVERTER WITH INVERTER OUTPUT FILTER; U.S. Patent Application Publication No. 2015/0123579 A1 to Liu et al., entitled METHOD AND APPARATUS FOR CONTROLLING POWER CONVERTER WITH INVERTER OUTPUT FILTER, and filed as U.S. patent application Ser. No. 14/555,769 on Nov. 28, 2014; U.S. Pat. No. 9,054,621 issued Jun. 9, 2015 to Liu et al., entitled POSITION SENSORLESS OPEN LOOP CONTROL FOR MOTOR DRIVES WITH OUTPUT FILTER AND TRANSFORMER; U.S. Patent Application Publication No. 2015/0194901 A1 to Liu et al., entitled POSITION SENSORLESS OPEN LOOP CONTROL FOR MOTOR DRIVES WITH OUTPUT FILTER AND TRANSFORMER, and filed as U.S. patent application Ser. No. 14/666,894 on Mar. 24, 2015; U.S. Pat. No. 9,054,611 issued Jun. 9, 2015 to Liu et al., entitled METHOD AND APPARATUS FOR STABILITY CONTROL OF OPEN LOOP MOTOR DRIVE OPERATION; U.S. Patent Application Publication No. 2015/0002067 A1 to Nondahl et al., entitled METHOD AND APPARATUS FOR STABILITY CONTROL OF OPEN LOOP MOTOR DRIVE OPERATION, and filed as U.S. patent application Ser. No. 14/193,329 on Feb. 28, 2014; U.S. patent application Ser. No. 14/565,781 filed Dec. 10, 2014 to Nondahl et al., entitled TRANSITION SCHEME FOR POSITION SENSORLESS CONTROL OF AC MOTOR DRIVES.

BACKGROUND INFORMATION

The subject matter disclosed herein relates to power conversion, and more specifically to controlling a power converter using current compensation based on an output filter transfer function.

BRIEF DESCRIPTION

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts of the disclosure in a simplified form prior to the more detailed description that is presented hereinafter. The present disclosure provides power conversion systems and methods to drive a motor load through a filter. A drive controller or processor computes a speed error value according to a speed reference value and a speed feedback value, and computes a torque reference value according to the speed error value for use in computing a motor current reference value. The motor current reference value is compensated according to capacitor currents of the output filter using a transfer function representing an output current to input current amplitude vs. frequency behavior of the output filter and the motor load. The inverter is controlled according to the inverter output current reference value, and the speed feedback value is estimated according to the inverter output current reference value.

DETAILED DESCRIPTION

Figure 1:
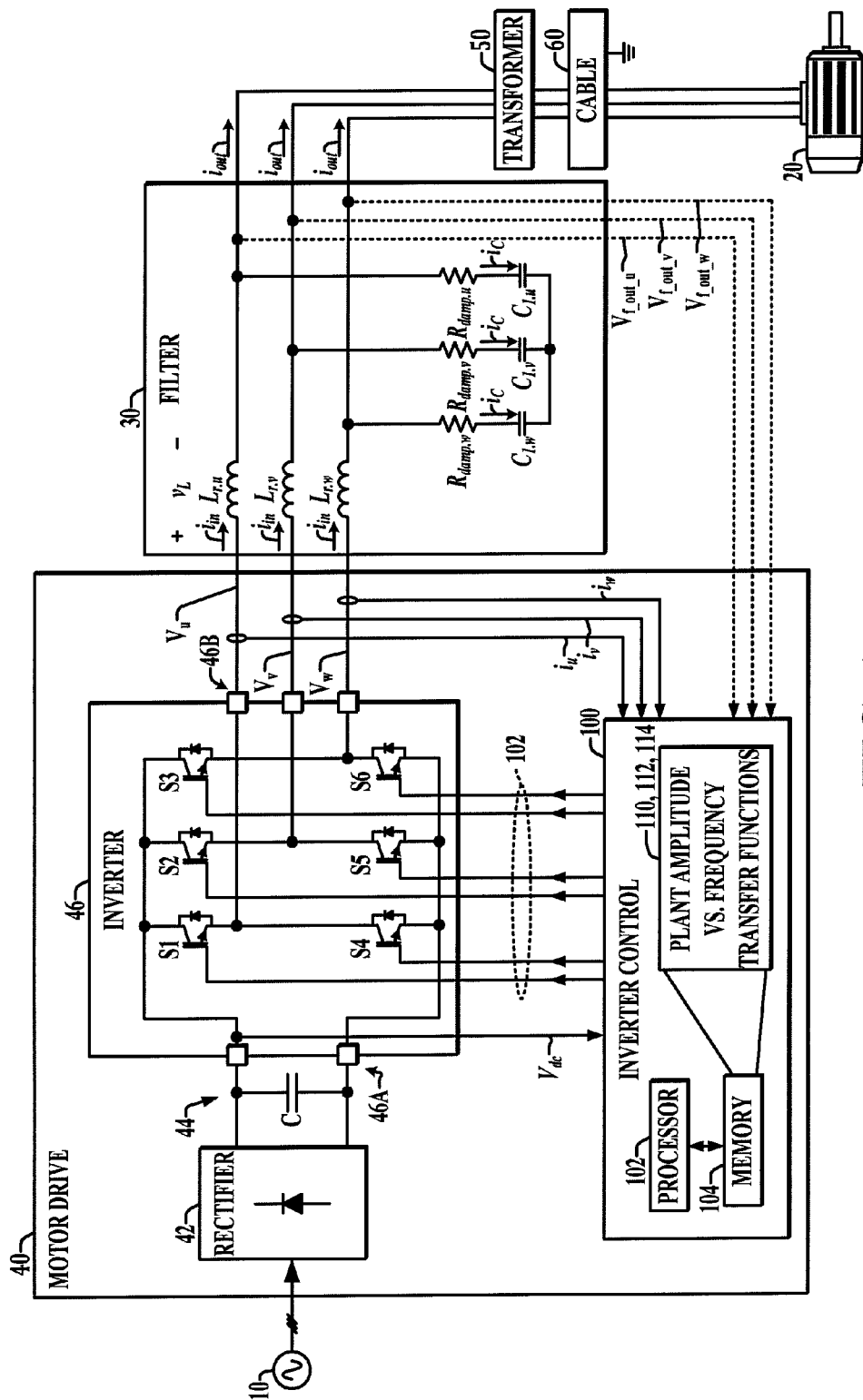
FIG. 1 is a schematic diagram of a motor drive power conversion system with an inverter driving a motor load through an output filter and a transformer.

Referring now to the figures, several embodiments or implementations are hereinafter described in conjunction with the drawings, wherein like reference numerals are used to refer to like elements throughout, and wherein the various features are not necessarily drawn to scale. FIG. 1 shows an example motor drive power conversion system 40 with an inverter 46 to drive an output load, such as a motor 20 through an intervening filter 30, referred to herein as an output filter or a sine wave filter. In certain implementations, as shown in FIG. 1, a transformer 50 can be connected between the output filter 30 and the driven motor load 20. Power conversion systems typically include an inverter stage to generate and provide AC output power to a load, such as a single or multi-phase AC motor. Pulse width modulated (PWM) output inverters provide output currents and voltages that include a number of pulses. Accordingly, output filters, such as sine wave filters are sometimes employed between the inverter output and the driven load to reduce the high frequency content caused by pulse width modulation of the inverter switches.

The presence of the output filter between the power conversion system and the load makes accurate control of the voltages and currents provided to the load more difficult, as the power delivered to the load is different from that delivered to the input of the filter. The output inverter stage may be controlled according to feedback signals measured at the inverter output terminals, but these feedback values generally do not represent the currents or voltages ultimately provided to the load. Feedback sensors can be provided at the load itself for direct measurement of the load parameters, but this increases system cost, and may not be possible in all applications.

Sensorless motor drives are used in a variety of applications, particularly where providing position and/or speed sensors directly at a motor load is difficult or impractical. In certain applications, a step-up transformer is used to boost the motor drive output voltage, allowing use of a low-voltage drive to power a medium voltage induction motor, and/or to reduce $I^2R$ losses and facilitate use of a smaller diameter cable wire for long cable runs between the motor drive and the driven motor. As previously discussed, certain applications also employ output filters between the motor drive inverter output and the transformer primary in order to suppress reflected wave voltage spikes associated with pulse width modulated (PWM) variable frequency drives. Use of sensorless voltage-frequency control techniques, however, may lead to problems, particularly where a transformer and/or sine wave filter is connected between the motor drive and the motor load. Conventional sensorless field-oriented-control (FOC) or other open loop speed control techniques have thus been found generally unsuitable for low-speed motor drive operation where output filters and transformers are used, such as in electric submersible pumps (ESPs), and these difficulties are particularly problematic in driving permanent magnet synchronous motors (PMSMs). Moreover, motors in sensorless speed control applications also suffer from oscillation in rotor velocity about the setpoint speed following load transitions or speed setpoint adjustments, particularly at low speeds. In certain situations, moreover, the driven motor may be unable to successfully start from a stopped condition due to unstable motor speed oscillations.

Presently disclosed embodiments provide power conversion systems 40 and inverter control methods and apparatus 100 to drive a motor load 20 through an intervening filter 30, which can also be used in combination with a transformer 50 and a potentially lengthy cables 60 coupled between the filter output and the driven motor load 20. FIG. 1 shows a motor drive power conversion system 40 with an inverter 46 and an inverter controller 100 configured to control current of a driven motor load 20 based on sensed or computed inverter output current signals or values $i_u$, $i_v$, $i_w$ representing output currents flowing at an AC output 46B of the inverter 46. The controller 100, moreover, is configured to compensate for the presence of an output filter 30 connected between the motor drive output 46B and the driven motor 20. In particular, the inverter controller 100 includes a processor 102 and an associated electronic memory 104 which stores one or more plant amplitude versus frequency transfer functions 110, 112, 114 to facilitate sensorless motor control with compensation for filter capacitor currents $i_C$ flowing in capacitor components $C_1$ of the filter 30.

The motor drive 40 receives single or multiphase AC input power from a power source 10 and converts this to a DC bus voltage using a rectifier 42 which provides a DC output voltage to a DC link circuit 44 having a capacitor $C_1$. The rectifier 42 can be a passive rectifier including one or more diode rectifier components, or may be an active front end (AFE) system with one or more rectifier switching devices (e.g., IGBTs, etc.) and an associated rectifier controller (not shown) for converting input AC electrical power to provide the DC bus voltage in the link circuit 44. Other configurations are possible in which the drive 40 receives input DC power from an external source (not shown) to provide an input to the inverter 46, in which case the rectifier 42 may be omitted. The DC link circuit 44 may include a single capacitor C or multiple capacitors connected in any suitable series, parallel and/or series/parallel configuration to provide a DC link capacitance across inverter input terminals 46A. In addition, while the illustrated motor drive 40 is a voltage source converter configuration including one or more capacitive storage elements in the DC link circuit 44, the various concepts of the present disclosure may be implemented in association with current source converter architectures in which a DC link circuit 44 includes one or more inductive storage elements, such as one or more series-connected inductors situated between the source of DC power (e.g., rectifier 42 or external DC source) and the input 46A of the inverter 46. In other possible implementations, the motor drive 40 includes a direct DC input to receive input power from an external source (not shown), and in certain embodiments the rectifier 42 and DC link circuit 44 may both be omitted.

The DC input 46A of the inverter 46 includes first and second (e.g., plus and minus) terminals connected to the DC link circuit 44, as well as a plurality of switching devices S1-S6 coupled between the DC input 46A and the motor drive AC output 46B. In operation, the inverter switching devices S1-S6 are actuated by inverter switching control signals 102 provided by the controller 100 to convert DC electrical power received at the DC input 46A to provide AC electrical output power as inverter output voltages, $V_u$, $V_v$, and $V_w$ and inverter output currents $i_u$, $i_v$, and $i_w$ at the AC output 46B. The filter circuit 30 receives the AC output from the inverter 46 of the motor drive 40. Although illustrated as driving a permanent magnet synchronous motor 20, the motor drive 40 can be employed in connection with other types of AC motor loads 20 and/or other forms of power converters to drive non-motor loads 20 using an output inverter 46. One or more feedback signals or values may be provided from the motor 20 itself, including a motor (e.g., rotor) position or angle signal $\theta_r$ and a motor speed or velocity signal $\omega_r$, although not a strict requirement of all embodiments of the present disclosure. The concepts of the present disclosure advantageously facilitate the sensorless speed estimation by the inverter controller 100, and thus direct feedback from the driven motor load 20 is not required in all implementations. In this regard, the motor drive 40 in certain embodiments implements a motor speed and/or position and/or torque control scheme in which the inverter controller 100 selectively provides the switching control signals 102 in a closed and/or open-loop fashion according to one or more setpoint values such as a motor speed setpoint, which can be a signal or value generated by the controller 100, or a fixed setpoint value, or such setpoint value can be received from an external system (not shown). In practice, the motor drive 40 may also receive a torque setpoint and/or a position (e.g., angle) setpoint, and such desired signals or values (setpoint(s)) may be received from a user interface and/or from an external device such as a distributed control system, etc. (not shown). As used herein, a signal can be an analog signal, such as a current or a voltage signal, or a signal can include digital values generated or consumed by the processor 102.

The inverter 46 of the motor drive 40 is connected to the load 20 through the intervening filter circuit 30. In the illustrated example of FIG. 1, the filter 30 is an "L-C" configuration in which each of the power converter output lines is connected to the motor through a series-connected filter inductor $L_r$ ($L_{r,u}$, $L_{r,v}$ and $L_{r,w}$ in the illustrated example), with a corresponding filter capacitor $C_1$ connected between the corresponding motor line and a common connection point (a neutral of a Y-connected set of filter capacitors $C_{1\_u}$, $C_{1\_v}$ and $C_{1\_w}$ in the illustrated example). In the example of FIG. 1, moreover, the damping resistors $R_{damp.u}$, $R_{damp.v}$ and $R_{damp.w}$ are connected in series with the filter capacitors $C_1$. The damping resistors can be omitted in certain embodiments. Other implementations are possible in which the filter capacitors $C_1$ are connected in a "Delta" configuration. In the illustrated (Y-connected) configuration, the filter circuit neutral point can be optionally connected to a circuit ground or other, connection point associated with the motor drive 40, although not a strict requirement of the present disclosure. The disclosed apparatus and techniques can be employed in connection with other forms and types of filter circuits 30, including without limitation L-C-L circuits, etc., of which behavior can typically be modeled as a second order system or filters which contain multiple inductive, capacitive, and resistive elements as further illustrated and described below.

The output of the filter circuit 30 provides motor phase currents $i_{out}$ to control the motor load 20, whereas the filter capacitor currents $i_C$ flow in the filter capacitors $C_1$ and non-zero voltages $v_L$ (i.e., filter voltages) may develop across one or more of the filter inductors $L_r$, whereby simple closed-loop control based on measured inverter output current signals or values $i_u$, $i_v$, $i_w$ may result in less than optimal operation of the driven load 20. At the same time, however, directly measuring the motor currents $i_{out}$ and/or motor voltages would require additional hardware and cabling, which may not be economically feasible or technically possible in certain applications. Nevertheless, for those cases where motor currents and/or motor voltages, such as $V_u$, $V_v$, $V_w$, $Y_{f\_out\_u}$, $Y_{f\_out\_v}$, and $V_{f\_out\_w}$ in FIG. 1, are measured, those signals can be used to enhance or replace the inverter current and/or voltage signals in the computation of the compensation signals. Certain embodiments of the inverter controller 100, however, advantageously provide steady-state compensation with respect to capacitor current based on the plant transfer function or functions 110, 112, 114 independent of the voltage feedback information. As seen in FIG. 1, moreover, the illustrated drive 40 may also include one or more current sensors configured to measure, sense, or otherwise detect at least one inverter output feedback signal or value (e.g., output currents $i_u$, $i_v$, $i_w$) which represent the output current at the AC output 46B of the inverter 46. The inverter controller 100 thus accommodates the presence of the filter circuit 30 (e.g., and any optionally included transformer 50 and potentially lengthy motor cable 60) between the motor drive output 46B and the driven motor load 20, without requiring addition of external sensors to sense the actual conditions at the motor load 20.

The controller 100 and the components thereof may be any suitable hardware, processor-executed software, processor-executed firmware, logic, or combinations thereof that are adapted, programmed, or otherwise configured to implement the functions illustrated and described herein. The controller 100 in certain embodiments may be implemented, in whole or in part, as software components executed using one or more processing elements, such as one or more processors 102, and may be implemented as a set of subcomponents or objects including computer executable instructions stored in the electronic memory 104 for operation using computer readable data executing on one or more hardware platforms such as one or more computers including one or more processors, data stores, memory, etc. The components of the controller 100 may be executed on the same computer processor or in distributed fashion in two or more processing components that are operatively coupled with one another to provide the functionality and operation described herein.

Figure 2:
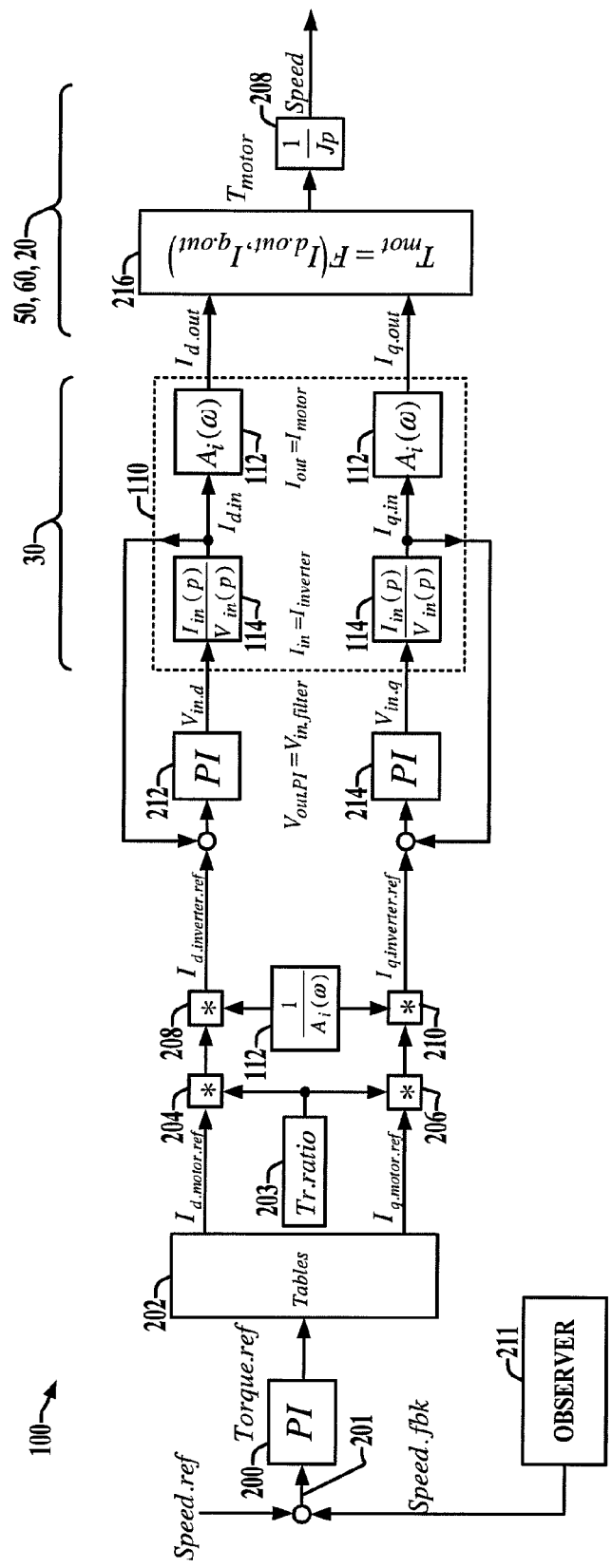
FIG. 2 is a schematic diagram of motor control and motor speed estimation components of the motor controller in FIG. 1.
Figure 3:
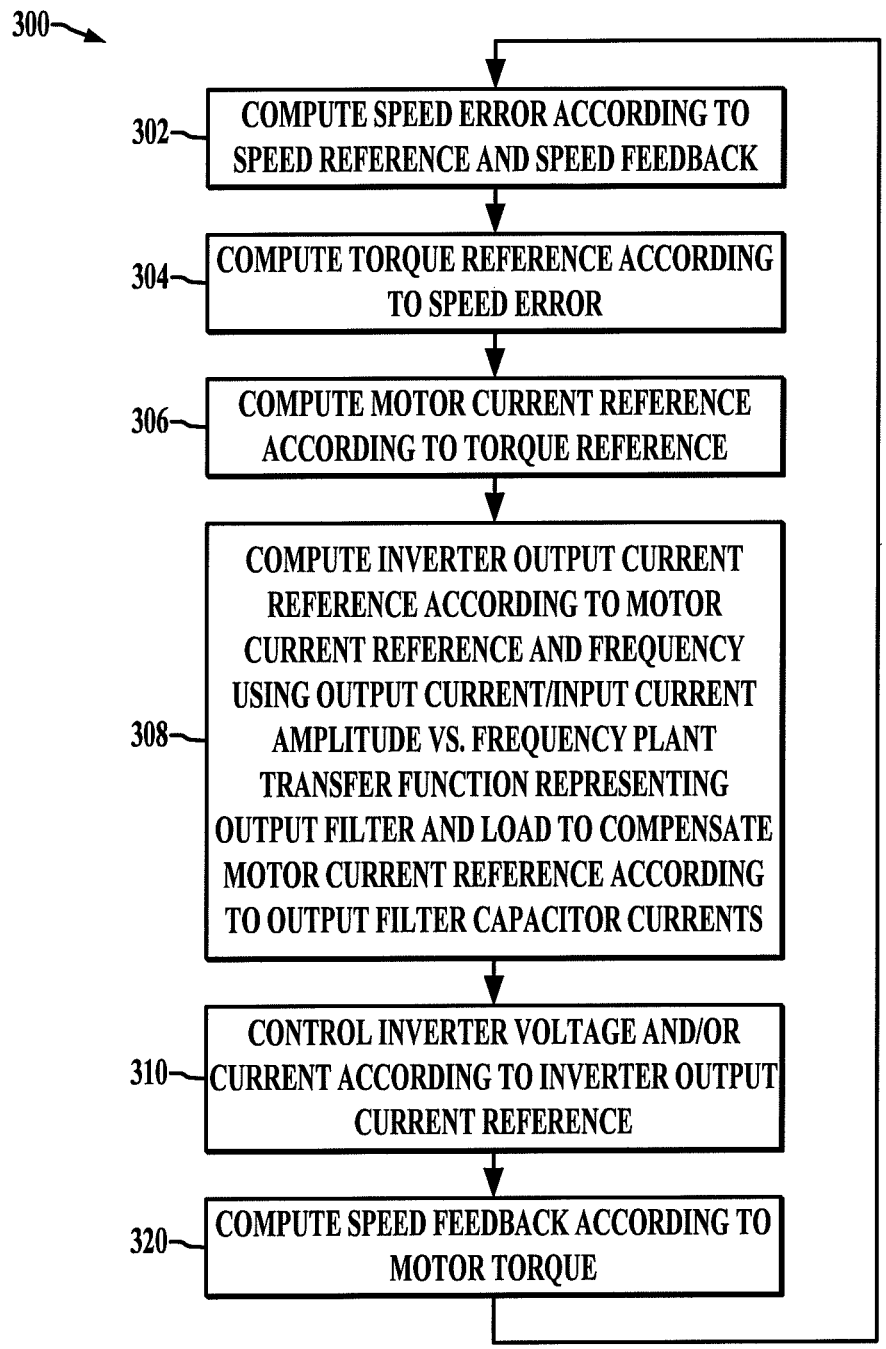
FIG. 3 is a flow diagram illustrating a method to control an inverter to drive a motor load through an intervening filter in the apparatus of FIGS. 1 and 2.

Referring also to FIGS. 2 and 3, FIG. 2 illustrates filter transfer functions, motor control and motor speed estimation components of the motor controller 100 in the motor drive 40 of FIG. 1, and FIG. 3 illustrates a process or method 300 of operating the motor drive inverter 46 to drive a motor load 20 through an intervening filter 30, which can be implemented in the motor controller 100. The controller 100 implements a closed loop control algorithm including one or more proportional-integral (PI) control components in order to control the driven load 20. FIG. 2 shows the mathematical implementation of the controlled process, including the controlled transformer object 30 shown as a plant transfer function or object transfer function 110 that includes two parts: one part is a first transfer function 112 relating filter input current and filter output current, and the other part is a second transfer function 114 that relates filter input current with filter input voltages. FIG. 2 shows a motor torque function 216 and a speed function 208 representing the transformer 50, the cable 60 and the driven motor load 20 driven at a final speed value "Speed". The controller 100, moreover, implements steady state filter current compensation using the first transfer function 112. In particular, the controller 100 in one example provides a compensation scheme for drives with output sine wave filters, in which the filter capacitor current is compensated by adjusting the motor current reference to provide an inverter current reference using the transfer function 112 independent of (e.g., without knowledge of) the voltages. In one possible implementation, the controller 100 implements the control scheme of FIG. 2 using the first transfer function 112 relating filter input current and filter output current.

The controller 100 in certain embodiments is configured by execution in the processor 102 of instructions in the memory 104 to implement the control configuration illustrated in FIG. 2, as described hereinafter in conjunction with the process 300 of FIG. 3. At 302, the controller 100 computes 302 a speed error value 201 according to a speed reference value Speed.ref and a speed feedback value Speed.fbk, for example, by subtracting the feedback value from the reference value. The feedback value can be obtained from any suitable source, including actual speed sensors (not shown) or from a speed observer 211 as shown in FIG. 2. As seen in FIG. 2, the controller 100 implements a proportional-integral (PI) control component 200 which receives the resulting speed error signal 201 and operates according to known proportional-integral control operation to compute a torque reference value Torque.ref according to the speed error value 201 at 304 in FIG. 3. At 306, the controller 100 uses one or more lookup tables 202 or solves one or more parametric equations (not shown) to compute one or more motor current reference values. In the example of FIG. 2, the controller 100 computes d and q axis motor current reference values Id.motor.ref and Iq.motor.ref according to the torque reference value Torque.ref, where this computation in certain examples includes indexing a lookup table 202. In this example, moreover, the controller 100 scales the d and q axis motor current reference values Id.motor.ref and Iq.motor.ref according to a turns ratio 203 of any included output transformer 50 via multiplier components 204 and 206, respectively.

At 308, the controller 100 compensates the motor current reference value or values Id,q.motor.ref according to capacitor currents $i_C$ of the output filter 30 by computing one or more inverter output current reference values (e.g., d and q axis values Id.inverter.ref and Iq.inverter.ref) according to the motor current reference value(s) Id,q.motor.ref and the operating frequency ω of the inverter 46 using the first transfer function 112 (1/A$_i$(ω)) via multiplier components 208 and 210, respectively. In one example, the first transfer function 112 represents the output current to input current amplitude vs. frequency behavior of the output filter 30 and the motor load 20. In certain embodiments, the first transfer function 112 includes parameter values representing impedance components (e.g., resistances, inductances, and/or capacitance) of the output filter 30 and the motor load 20. In other implementations, the transfer function 112 further includes parameters representing impedance components of any intervening transformer 50 and/or of the motor cable 60. In certain embodiments, moreover, the parameter values of the first transfer function 112 are configurable to adapt the power conversion system 40 for different output filters 30 and different motor loads 20. For example, the motor drive 40 and the inverter controller 100 are programmable in certain implementations to accept programming values for the parameters of a given filter 30 and/or motor load 20. This allows a user to adapt the motor drive 40 for use in combination with a variety of different filter and motor combinations.

At 310, the controller 100 provides the inverter switching control signals 102 to control the inverter 46 according to the inverter output current reference value(s) Id,q.inverter.ref, and the controller 100 computes or estimates the speed feedback value Speed.fbk according to any suitable measured or inferred value, such as inverter currents and voltages in one example. In another example, the controller uses sensor information for the speed feedback. In this manner, the current and voltage control of the driven motor 20 is compensated according to the transfer function 112 that characterizes the components of the intervening filter 30. Moreover, the controller 100 in certain embodiments implements sensorless speed control according to the estimated speed feedback value Speed.fbk without requiring speed feedback. In practice, without wishing to be tied to any particular theory, the steady state filter current compensation implemented by the controller 100 advantageously mitigates or avoids unwanted output oscillation in the motor speed and/or torque for sensorless ESP and other applications, thereby facilitating higher frequency operation of the driven motor load 20. This is particularly beneficial for deep well pumping applications where pumping speeds are important and the motor cable 60 may be quite lengthy.

In certain embodiments, the controller 100 implements voltage control. In the example of FIG. 2, the controller 100 is operative to control the inverter 46 according to the inverter output current reference value Id,q.inverter.ref by computing an inverter output voltage control value Vin.d,q, for example, d and q values Vin.d and Vin.q computed using voltage control PI components 212 and 214, respectively, according to the inverter output current reference value(s) Id,q.inverter.ref and an inverter output current value(s) Id,q.$_{in}$. In certain examples, the inverter output current value or values Id,q.$_{in}$ (e.g., Id.$_{in}$ and Iq.$_{in}$) can be obtained from feedback sensors (e.g., as shown in FIG. 1 above), or these can be computed by the controller 100. The controller 100 provides the inverter switching control signals 102 at 310 in this example to control the inverter 46 according to the inverter output voltage control value(s) Vin.d,q.

In other possible implementations, the controller 100 operates to control the inverter 46 according to the inverter output current reference value Id,q.inverter.ref. In this case, the controller 100 computes the inverter output current value(s) Id,q.$_{in}$ according to the inverter output current reference value Id,q.inverter.ref and the inverter output current value Id,q.$_{in}$, and provides the inverter switching control signals 102 to control the inverter 46 (e.g., at 310 in FIG. 3) according to the inverter output current value Id,q.$_{in}$. In this example, the PI controllers 212 and 214 provide the computed inverter output current value(s) Id,q.$_{in}$.

The controller 100 thus implements capacitor current compensation for motor drives and other power conversion systems 40 to drive a motor 20 using an inverter 46 in systems employing and output sine wave filter 30 using filter and plant parameters without knowledge of voltages. The disclosed apparatus and method examples advantageously employ the transfer function 112 for filter capacitor current compensation in view of the impedance parameters of the output filter 30 and the load, including any associated transformer 50 and the driven motor 20 itself. Moreover, the drive 40 and the controller 100 are programmable to adapt to different filter and/or driven motor combinations.

Referring now to FIGS. 4-11, various example output filters 30 are presented, along with derived transfer functions for the filters and corresponding driven load 20. The following description illustrates the specifics of the first and second transfer functions 112 and 114, in which the first transfer function 112 expresses the relationship between the filter input current and the filter output current according to the following equation (1):

$$Ai(\omega) = Iout/Iin. \tag{1}$$

Figure 4:
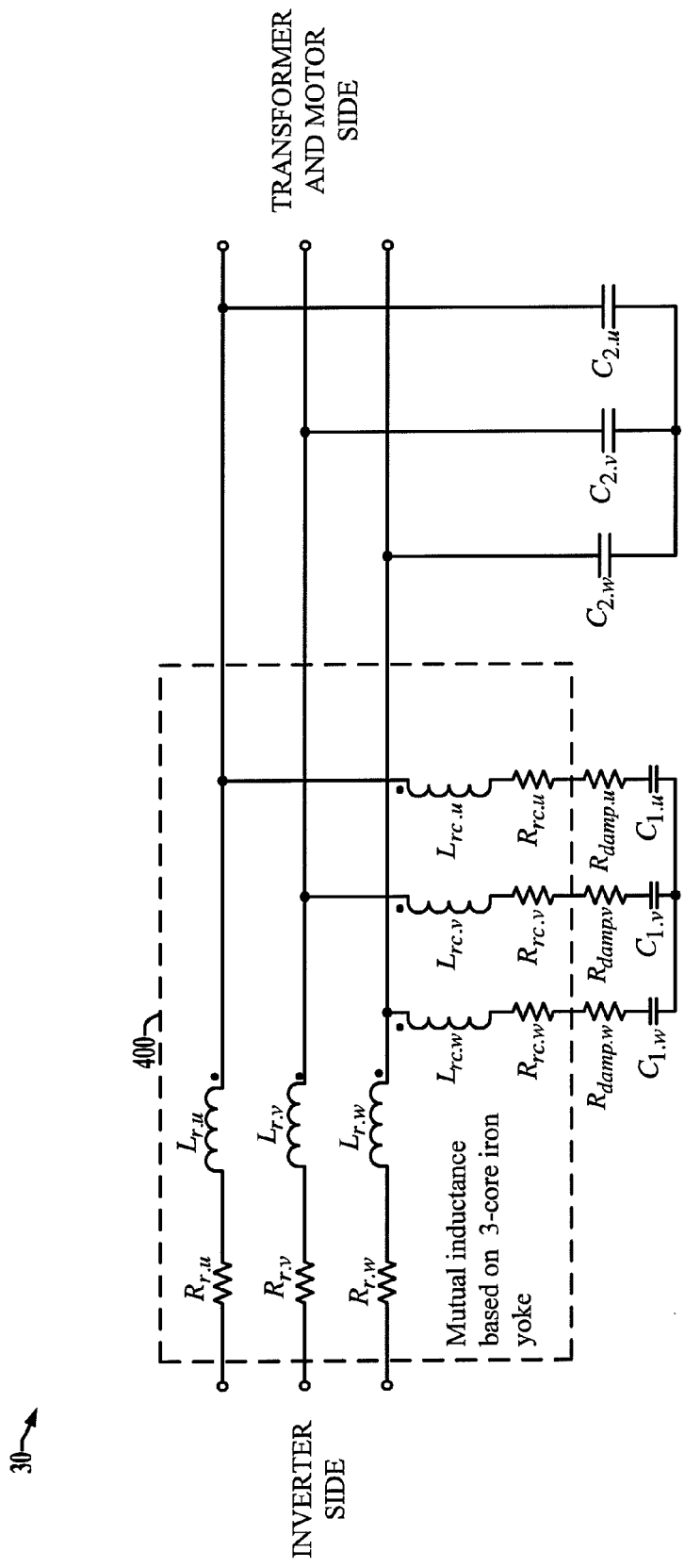
FIG. 4 is a schematic diagram of an example three-phase sine wave output filter with two reactor windings between the inverter and the transformer of FIG. 1.
Figure 5:
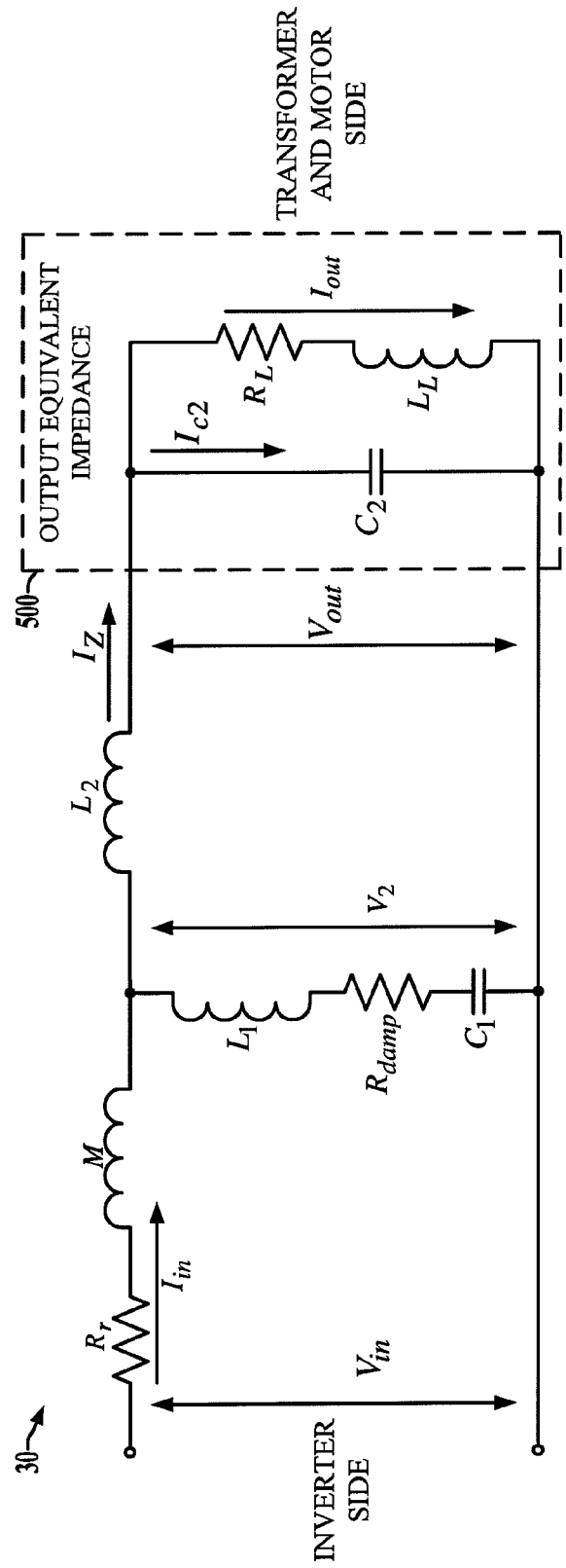
FIG. 5 is a schematic diagram of a single phase equivalent of the filter in FIG. 4 and the impedance components of the load.
Figure 6:
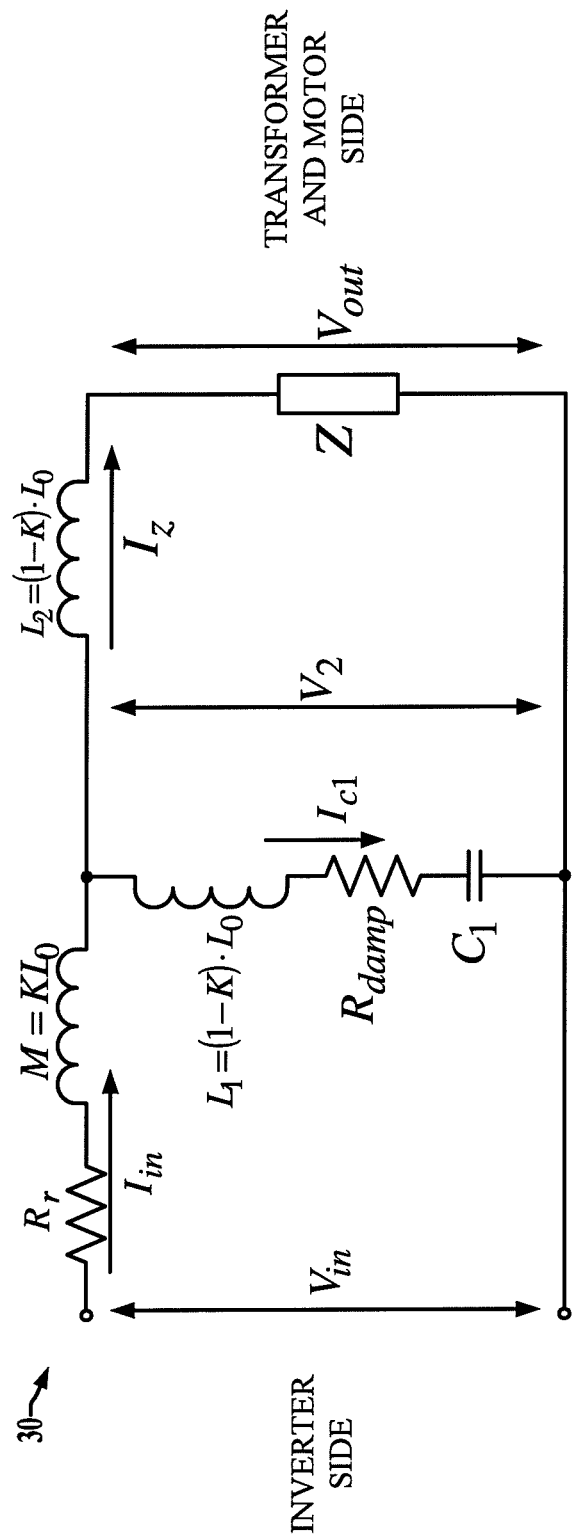
FIG. 6 is a schematic diagram of a reconfiguration of the filter of FIG. 5.

FIGS. 4-6 illustrate an example filter circuit 30 including two reactor windings implemented using a 3-core iron yoke, depicted at 400 in FIG. 4. FIG. 5 shows a single phase equivalent of the filter in FIG. 4 and the impedance components 500 of the load, and FIG. 6 illustrates a reconfiguration of the filter of FIG. 5. The mutual inductance for one example phase in FIG. 4 (e.g. the phase "u") can be written as follows:

$$M_u = K \cdot \sqrt{L_{r,u} \cdot L_{rc,u}} \tag{1}$$

$$0 < K \le 1 \tag{2},$$

where "K" is a coupling coefficient. The single phase equivalent circuit shown in FIG. 5 includes the mutual inductance "M", decoupling parts "L$_1$" and "L$_2$", and load equivalent impedance "R$_L$," and "L$_L$", where:

$$M = K \cdot L_0 \tag{3, and}$$

$$L_1 = L_2 = (1-K)L_0 \tag{4}.$$

The corresponding resonance frequencies (Hz) can be written as follows:

$$f_1 = \frac{1}{2 \cdot \pi \cdot \sqrt{C_1 L_0}} \tag{5}$$

$$f_2 = \frac{1}{2 \cdot \pi \cdot \sqrt{\left(\frac{C_1 \cdot C_2}{C_1 + C_2}\right) \cdot (L_0 - M)}} \tag{6}$$

The damping factor "ξ" can be written as follows:

$$\xi = \frac{R_{damp}1}{2} \cdot \sqrt{\frac{C_1}{L_0}} \tag{7}$$

Reorganizing according to equations 3 and 4 yields the reorganized equivalent circuit shown in FIG. 6. The following derivation solves for the transfer functions Vout/Vin and Iout/Iin, using an impedance component "Z" as the equivalent impedance that includes "$R_L$, $L_L$" and capacitor "$C_2$" of FIG. 5, where Z is expressed according to the following equation (8):

$$Z = R_L \frac{1 + \frac{L_L}{R_L} p}{L_L C_2 p^2 + R_L C_2 p + 1} \quad (8)$$

The following equation (9) can be used to calculate the current $I_z$ using equation (8):

$$I_z = \frac{V_2}{(1-K)L_o p + Z} = V_2 * \frac{L_L C_2 p^2 + R_L C_2 p + 1}{pL_2 \cdot (L_L C_2 p^2 + R_L C_2 p + 1) + R_L + L_L} \quad (9)$$

After some manipulation, the current through the impedance Z is given according to the following equation (10):

$$I_z = \frac{V_2}{R_L} \cdot \frac{L_L C_2 p^2 + R_L C_2 p + 1}{L_2 C_2 \frac{L_L}{R_L} p^3 + L_2 C_2 p^2 + \left(\frac{L_2 + L_L}{R_L}\right)p + 1} \quad (10)$$

The output voltage (e.g., FIG. 6) can be expressed according to the following equation (11):

$$V_{out} = Z * I_z = V_2 \cdot \frac{1 + \frac{L_L}{R_L}p}{L_2 C_2 \frac{L_L}{R_L} p^3 + L_2 C_2 p^2 + \left(\frac{L_2 + L_L}{R_L}\right)p + 1} \quad (11)$$

The filter capacitor current $I_{c1}$ can be expressed by the following equation (12):

$$I_{c1} = \frac{V_3}{R_{damp} + L_1 p + \frac{1}{C_1 p}} = \frac{V_3 C_1 p}{L_1 C_1 p^2 + R_{damp} C_1 p + 1} \quad (12)$$

The input current provided to the filter 30 is given by the following equation (13):

$$I_{in} = I_z + I_{c1} \quad (13)$$

Substituting equations (10) and (12) into equation (13), gives the following representations of the input current in the voltage $V_2$:

$$I_{in} = I_z + I_{c1} = V_2 * \left[ \frac{C_1 p}{L_1 C_1 p^2 + R_{damp} C_1 p + 1} + \right. \quad (14)$$
$$\left. \frac{1}{R_L} * \frac{L_L C_2 p^2 + R_L C_2 p + 1}{L_2 C_2 \frac{L_L}{R_L} p^3 + L_2 C_2 p^2 + \left(\frac{L_2 + L_L}{R_L}\right)p + 1} \right]$$

$$V_2 = \frac{I_{in}}{\left[ \frac{C_1 p}{L_1 C_1 p^2 + R_{damp} C_1 p + 1} + \frac{1}{R_L} * \frac{L_L C_2 p^2 + R_L C_2 p + 1}{L_2 C_2 \frac{L_L}{R_L} p^3 + L_2 C_2 p^2 + \left(\frac{L_2 + L_L}{R_L}\right)p + 1} \right]} \quad (15)$$

$$V_2 = I_{in} * \frac{(L_1 C_1 p^2 + R_{damp} C_1 p + 1) * R_L * \left(L_2 C_2 \frac{L_L}{R_L} p^3 + L_2 C_2 p^2 + \left(\frac{L_2 + L_L}{R_L}\right)p + 1\right)}{R_L C_1 p * \left(L_2 C_2 \frac{L_L}{R_L} p^3 + L_2 C_2 p^2 + \left(\frac{L_3 + L_L}{R_L}\right)p + 1\right) + (L_1 C_1 p^2 + R_{damp} C_1 p + 1) * (L_L C_2 p^2 + R_L C_2 p + 1)} \quad (16)$$

Substituting equation (16) into equation (11), yields the following equation (17):

$$V_{out} = I_{in} * \frac{(L_1 C_1 p^2 + R_{damp} C_1 p + 1) * R_L * \left(1 + \frac{L_L}{R_L} p\right)}{R_L C_1 p * \left(L_2 C_2 \frac{L_L}{R_L} p^3 + L_2 C_2 p^2 + \left(\frac{L_2 + L_L}{R_L}\right)p + 1\right) + (L_1 C_1 p^2 + R_{damp} C_1 p + 1) * (L_L C_2 p^2 + R_L C_2 p + 1)} \quad (17)$$

From equation (15), the input current can be expressed according to the following equation (18):

$$I_{in} = V_2 \cdot \frac{R_L C_1 p \cdot \left[L_2 C_2 \frac{L_L}{R_L} p^3 + L_2 C_2 p^2 + \left(\frac{L_2 + L_L}{R_L}\right)p + 1\right] + (L_1 C_1 p^2 + R_{damp} C_1 p + 1) \cdot (L_L C_2 p^2 + R_L C_2 p + 1)}{(L_1 C_1 p^2 + R_{damp} C_1 p + 1) \cdot R_L \cdot \left[L_2 C_2 \frac{L_L}{R_L} p^3 + L_2 C_2 p^2 + \left(\frac{L_2 + L_L}{R_L}\right)p + 1\right]} \quad (18)$$

The voltage $V_2$ can then be expressed according to the following equation (19):

$$V_2 = V_{in} - I_{in} * (R_r + KL_0 P) \quad (19)$$

From equations (15) and (19), the following relationships can be determined:

$$\frac{I_{in}}{\left[ \frac{C_1 p}{L_1 C_1 p^2 + R_{damp} C_1 p + 1} + \frac{1}{R_L} * \frac{L_L C_2 p^2 + R_L C_2 p + 1}{L_2 C_2 \frac{L_L}{R_L} p^3 + L_2 C_2 p^2 + \left(\frac{L_2 + L_L}{R_L}\right)p + 1} \right]} = V_{in} - I_{in} * (R_r + KL_0 p) \quad (20)$$

Or:

$$V_{in} = I_{in} * \left\{ (R_r + KL_0 p) + \frac{1}{\left[ \frac{C_1 p}{L_1 C_1 p^2 + R_{damp} C_1 p + 1} + \frac{1}{R_L} * \frac{L_L C_2 p^2 + R_L C_2 p + 1}{L_2 C_2 \frac{L_L}{R_L} p^3 + L_2 C_2 p^2 + \left(\frac{L_2 + L_L}{R_L}\right)p + 1} \right]} \right\} \quad (21)$$

-continued $$V_{in} = I_{in} * \frac{(R_r + KL_0 p) * \left[\frac{\frac{C_1 p}{L_1 C_1 p^2 + R_{damp} C_1 p + 1} + \frac{1}{R_L} *}{\frac{L_L C_2 p^2 + R_L C_2 p + 1}{L_2 C_2 \frac{L_L}{R_L} p^3 + L_2 C_2 p^2 + \left(\frac{L_2 + L_L}{R_L}\right) p + 1}}\right] + 1}{\left[\frac{\frac{C_1 p}{L_1 C_1 p^2 + R_{damp} C_1 p + 1} + \frac{1}{R_L} *}{\frac{L_L C_2 p^2 + R_L C_2 p + 1}{L_2 C_2 \frac{L_L}{R_L} p^3 + L_2 C_2 p^2 + \left(\frac{L_2 | L_L}{R_L}\right) p + 1}}\right]} \quad (22)$$

$$\frac{I_{in}}{V_{in}} = \frac{\left[\frac{\frac{C_1 p}{L_1 C_1 p^2 + R_{damp} C_1 p + 1} + \frac{1}{R_L} *}{\frac{L_L C_2 p^2 + R_L C_2 p + 1}{L_2 C_2 \frac{L_L}{R_L} p^3 + L_2 C_2 p^2 + \left(\frac{L_2 + L_L}{R_L}\right) p + 1}}\right]}{(R_r | KL_0 p) * \left[\frac{\frac{C_1 p}{L_1 C_1 p^2 + R_{damp} C_1 p + 1} | \frac{1}{R_L} *}{\frac{L_L C_2 p^2 + R_L C_2 p + 1}{L_2 C_2 \frac{L_L}{R_L} p^3 + L_2 C_2 p^2 + \left(\frac{L_2 + L_L}{R_L}\right) p + 1}}\right] | 1} \quad (23)$$

After some manipulation the input current to input voltage transfer function can be expressed according to the following equation (24):

$$\frac{I_{in}}{V_{in}} = \frac{1}{R_r} \cdot \frac{m_4 p^4 + m_3 p^3 + m_2 p^2 + m_1 p + 1}{n_5 p^5 + n_4 p^4 + n_3 p^3 + n_2 p^2 + n_1 p + 1} \quad (24)$$

Where:

$$m_4 = C_1(L_1 + L_2) \cdot C_2 L_L \quad (25)$$

$$m_3 = C_1 R_L \cdot C_2 \left(L_1 + L_2 + \frac{R_{damp}}{R_L} L_L\right) \quad (26)$$

$$m_2 = C_1(L_1 + L_2 + L_L) + C_2 L_L + C_2 R_L \cdot C_1 R_{damp} \quad (27)$$

$$m_1 = C_1(R_L + R_{damp}) + C_2 R_L \quad (28)$$

$$n_5 = \frac{KL_0}{R_r} L_L C_1(L_1 + L_2)C_2 + L_1 C_1 L_2 C_2 \frac{L_L}{R_L} \quad (29)$$

$$n_4 = \frac{R_L}{R_r} KL_0 C_1 \left(L_1 + L_2 + \frac{R_{damp}}{R_L} L_L\right) C_2 + L_L C_1(L_1 + L_2)C_2 + L_2 C_2 \left(L_1 C_1 + R_{damp} C_1 \frac{L_L}{R_L}\right) \quad (30)$$

$$n_3 = \frac{KL_0}{R_r} C_1(L_1 + L_2 + L_L) + \frac{R_L}{R_r} KL_0 C_2 \left(\frac{L_L}{R_L} + R_{damp} C_1\right) + L_1 C_1 \frac{L_2 + L_L}{R_L} + L_2 C_2 \left(R_{damp} C_1 + \frac{L_L}{R_L}\right) \quad (31)$$

$$n_1 = \frac{R_L}{R_r} KL_0(C_1 + C_2) + \frac{R_{damp}}{R_r} KL_0 C_1 + L_1 C_1 + L_2 C_2 + \frac{R_{damp}}{R_L} C_1(L_1 + L_2) + C_1(L_1 + L_2 + L_L) + R_L C_2 \left(\frac{L_L}{R_L} + R_{damp} C_1\right) \quad (32)$$

$$n_1 = \frac{KL_0}{R_r} + R_L(C_1 + C_2) + 2R_{damp} C_1 + \frac{L_2 + L_L}{R_L} \quad (33)$$

From equation (17), the following input current formula can be obtained:

$$I_{in} = V_{out} \cdot \frac{R_L C_1 p * \left(L_2 C_2 \frac{L_L}{R_L} p^3 + L_2 C_2 p^2 + \left(\frac{L_2 + L_L}{R_L}\right) p + 1\right) +}{R_L \cdot (L_1 C_1 p^2 + R_{damp} C_1 p + 1) \cdot \left(1 + \frac{L_L}{R_L} p\right)} \quad (34)$$

Further manipulation according to equations 25-28 yields the following expression of the filter input current:

$$I_{in} = V_{out} \cdot \frac{1}{R_L} \cdot \frac{m_4 p^4 + m_3 p^3 + m_2 p^2 + m_1 p + 1}{(g_2 p^2 + g_1 p + 1) \cdot \left(1 + \frac{L_L}{R_L} p\right)} \quad (35)$$

Where:

$$g_2 = C_1 L_1 \quad (36)$$

$$g_1 = R_{damp} C_1 \quad (37)$$

From equations (24) and (35), the following output-to-input voltage transfer functions can be derived:

$$\frac{V_{out}}{V_{in}} = \frac{R_L}{R_r} \cdot \frac{(g_2 p^2 + g_1 p + 1) \cdot \left(1 + \frac{L_L}{R_L} p\right)}{n_5 p^5 + n_4 p^4 + n_3 p^3 + n_2 p^2 + n_1 p + 1} \quad (38)$$

Or:

$$\frac{V_{out}}{V_{in}} = \frac{R_L}{R_r} \cdot \frac{d_3 p^3 + d_2 p^2 + d_1 p + 1}{n_5 p^5 + n_4 p^4 + n_3 p^3 + n_2 p^2 + n_1 p + 1} \quad (39)$$

Where:

$$d_3 = C_1 L_1 \frac{L_L}{R_L}, \quad (40)$$

$$d_2 = C_1 \left(L_1 + L_L \cdot \frac{R_{damp}}{R_L}\right), \text{ and} \quad (41)$$

$$d_1 = C_1 R_{damp} + \frac{L_L}{R_L} \quad (42)$$

As seen in FIG. 5, the output current can be expressed according to the following equation (43):

$$I_{out} = \frac{V_{out}}{R_L | L_L p} = \frac{V_{out}}{R_L} * \frac{1}{\left(1 + \frac{L_L}{R_L} p\right)} \quad (43)$$

The following output current-to-input voltage equation (44) can be obtained from equations (38) and (43):

$$\frac{I_{out}}{V_{in}} = \frac{1}{R_r} \cdot \frac{(g_2 p^2 + g_q p + 1)}{n_5 p^5 + n_4 p^4 + n_3 p^3 + n_2 p^2 + n_1 p + 1} \quad (44)$$

From equations (24) and (44), the first transfer function 112 can be expressed according to the following equation (45) to relate amplitude as a function of frequency for the filter 30 and the plant (load):

$$A_i(\omega) = \frac{I_{out}}{I_{in}} = \frac{(g_2 p^2 + g_q p + 1)}{m_4 p^4 + m_3 p^3 + m_2 p^2 + m_1 p + 1} \quad (45)$$

A phase-frequency response can also be obtained for equations (24), (39), (44-45). Substituting "$j\omega$" for the operator "$p$" in equation (45), gives the following equation (46):

$$\frac{I_{out}(j\omega)}{I_{in}(j\omega)} = \frac{g_2(j\omega)^2 + g_1(j\omega) + 1}{m_4(j\omega)^4 + m_3(j\omega)^3 + m_2(j\omega)^2 + m_1(j\omega) + 1} \quad (46)$$

$$= \frac{(1 - g_2\omega^2) + jg_1\omega}{(1 + m_4\omega^4 - m_2\omega^2) - j(m_3\omega^3 - m_1\omega)}$$

After some manipulation, the following transfer function equations (47) and (48) can be derived:

$$\frac{I_{out}(j\omega)}{I_{in}(j\omega)} = \frac{-g_2 m_4\omega^6 + (m_4 + g_2 m_2 - g_1 m_3)\omega^4 + (g_1 m_1 - m_2)\omega^2}{(1 + m_4\omega^4 - m_2\omega^2)^2 + (m_3\omega^3 - m_1\omega)^2} + \quad (47)$$

$$j\frac{[(g_1 m_4 - g_2 m_3)\omega^5 + (m_3 - g_1 m_2 + g_2 m_1)\omega^3]}{(1 + m_4\omega^4 - m_2\omega^2)^2 + j(m_3\omega^3 - m_1\omega)^2}$$

Or:

$$\frac{I_{out}(j\omega)}{I_{in}(j\omega)} = a_i(\omega) + jb_i(\omega) \quad (48)$$

Where:

$$a_i(\omega) = \frac{1 + (g_1 m_1 - m_2)\omega^2 + (m_4 + g_2 m_2 - g_1 m_3)\omega^4 - g_2 m_4\omega^6}{(1 - m_2\omega^2 + m_4\omega^4)^2 + (m_3\omega^3 - m_1\omega)^2} \quad (49)$$

$$b_i(\omega) = \frac{[(g_1 m_4 - g_2 m_3)\omega^5 + (m_3 - g_1 m_2 + g_2 m_1)\omega^3]}{(1 + m_4\omega^4 - m_2\omega^2)^2 + (m_3\omega^3 - m_1\omega)^2} \quad (50)$$

The amplitude-frequency response $A_i(\omega)$ can be represented according to the following equation (51):

$$A_i(\omega) = \quad (51)$$

$$\sqrt{a_i^2 + b_i^2} = \sqrt{\frac{\left[1 + (g_1 m_1 - m_2)\omega^3 + (m_4 + g_2 m_2 - g_1 m_3)\omega^4 - g_2 m_6\omega^6\right]^2 + \left[(g_1 m_4 - g_2 m_2)\omega^5 + (m_3 - g_1 m_2 + g_2 m_2)\omega^3\right]^2}{(1 + m_6\omega^6 + m_2\omega^2)^2 + (m_3\omega^3 - m_1\omega)^2}}$$

The phase-frequency response $\phi_i(\omega)$ can be represented as follows:

$$\phi_i(\omega) = A\ \text{TAN}\ 2(a_i, b_i) \quad (52)$$

Again substituting "$j\omega$" for the operator "$p$" in equation (24) gives the following equation (53):

$$\frac{I_{in}(j\omega)}{V_{in}(j\omega)} = \quad (53)$$

-continued $$\frac{1}{R_r} \cdot \frac{m_4(j\omega)^4 + m_3(j\omega)^3 + m_2(j\omega)^2 + m_1(j\omega) + 1}{n_5(j\omega)^5 + n_4(j\omega)^4 + n_3(j\omega)^3 + n_2(j\omega)^2 + n_1(j\omega) + 1} =$$

$$\frac{1}{R_r} \cdot \frac{(1 + m_4\omega^4 + m_2\omega^2) - j(m_3\omega^3 - m_1\omega)}{(1 + n_4\omega^4 - n_2\omega^2) + j(n_5\omega^5 - n_3\omega^3 + n_1\omega)}$$

After some manipulation the following equation (54) can be derived:

$$\frac{I_{in}(j\omega)}{V_{in}(j\omega)} = a_{iv}(\omega) + jb_{iv}(\omega) \quad (54)$$

Where:

$$a_{iv}(\omega) = \frac{1}{R_r} \cdot \quad (55)$$

$$\frac{1 + (n_1 m_1 - n_2 - m_2)\omega^2 + (n_4 + m_4 + n_2 m_2 - n_1 m_3 - n_3 m_1)\omega^4 - (n_3 m_3 + n_5 m_1 - n_2 m_4 - n_4 m_2)\omega^6 + (n_4 n)}{(1 + n_4\omega^4 - n_2\omega^2)^2 + (n_5\omega^5 - n_3\omega^3 + n_1\omega)^2}$$

$$b_{iv}(\omega) = \frac{1}{R_r} \cdot \frac{\begin{array}{l}(m_1 n_1)\omega + (n_3 + n_1 m_2 - n_2 m_1 - m_3)\omega^3 + \\ (n_4 m_1 + n_2 m_3 - n_1 m_4 - n_3 m_2 - n_5)\omega^5 + \\ (n_3 m_4 + n_5 m_2 - n_4 m_3)\omega^7\end{array}}{(1 + n_4\omega^4 - n_2\omega^2)^2 + (n_5\omega^5 - n_3\omega^3 + n_1\omega)^2}. \quad (56)$$

The amplitude-frequency response $A_{iv}(\omega)$ can be represented as follows:

$$A_{iv}(\omega) = \sqrt{a_{iv}^2 + b_{iv}^2} \quad (57)$$

The phase-frequency response $\phi_{iv}(\omega)$ can be represented as follows:

$$\phi_{iv}(\omega) = A\ \text{TAN}\ 2(a_{iv}, b_{iv}) \quad (58)$$

Again substituting "$j\omega$" for the operator "$p$" in equation (39), gives the following equation (59):

$$\frac{V_{out}(p)}{V_{in}(p)} = \frac{R_L}{R_r} \cdot \frac{d_3(j\omega)^3 + d_2(j\omega)^2 + d_1(j\omega) + 1}{n_5(j\omega)^5 + n_4(j\omega)^4 + n_3(j\omega)^3 + n_2(j\omega)^2 + n_1(j\omega) + 1} \quad (59)$$

$$= \frac{(1 + d_2\omega^2) - j(d_3\omega^3 - d_1\omega)}{(1 + n_4\omega^4 - n_2\omega^2) + j(n_5\omega^5 - n_3\omega^3 + n_1\omega)}$$

After some manipulation, the following output-input voltage relationship (60) can be derived:

$$\frac{V_{out}(p)}{V_{in}(p)} = a_v(\omega) + jb_v(\omega) \quad (60)$$

Where:

$$a_v(\omega) = \frac{R_L}{R_r} \cdot \frac{\begin{array}{l}1 + (d_1 n_1 - n_2 - d_2)\omega^3 + \\ (n_4 + d_2 n_2 - d_3 n_1 - d_1 n_3)\omega^4 + \\ (d_3 n_3 - d_2 n_4 + d_1 n_5)\omega^6 - d_3 n_5 \omega^8\end{array}}{(1 + n_4\omega^4 - n_2\omega^2)^2 + (n_5\omega^5 - n_3\omega^3 + n_1\omega)^2} \quad (61)$$

-continued $$b_v(\omega) = \frac{R_L}{R_r} \cdot \frac{(d_1 - n_1)\omega + (d_2 n_1 + n_3 - d_1 n_2 - d_3)\omega^3 +}{(1 + n_4 \omega^4 - m_3 \omega^2)^2 + (n_5 \omega^5 - n_3 \omega^3 + n_1 \omega)^2} \quad (61)$$

Amplitude-frequency response $A_v(\omega)$ can be represented as follows:

$$A_v(\omega) = \sqrt{a_v^2 + b_v^2} \quad (63)$$

Phase-frequency response $\phi_{iv}(\omega)$ can be represented as follows:

$$\phi_v(\omega) = A\ \text{TAN}\ 2(a_v, b_v) \quad (64)$$

Let's substitute "$j\omega$" instead of operator "$p$" into equation (44), then:

$$\frac{I_{out}(p)}{V_{in}(p)} = \frac{1}{R_r} \cdot \frac{g_2(j\omega)^2 | g_1(j\omega) | 1}{n_5(j\omega)^5 + n_4(j\omega)^4 + n_3(j\omega)^3 +} \quad (65)$$
$$n_2(j\omega)^2 + n_1(j\omega) + 1$$

$$= \frac{1}{(R_2 + R_2)} * \frac{(1 - g_2\omega^2) + jg_1\omega}{(1 + n_4\omega^4 - n_2\omega^2) +}$$
$$j(n_5\omega^5 - n_3\omega^3 + n_1\omega)$$

After some manipulation we can derived:

$$\frac{I_{out}(p)}{V_{in}(p)} = \alpha_{i-out,v}(\omega) + jb_{i-out,v}(\omega) \quad (66)$$

Where:

$$a_{i-out,v}(\omega) = \quad (67)$$
$$\frac{1}{R_r} \cdot \frac{1|(g_1 n_1\ n_2\ g_2)\omega^2 | (n_4\ g_2 n_2\ g_1 n_3)\omega^4|(g_1 n_5\ g_2 n_4)\omega^6}{(1 + n_4\omega^4 - n_2\omega^2)^2 + (n_5\omega^5 - n_3\omega^3 + n_1\omega)^2}$$

$$b_{i-out,v}(\omega) = \frac{1}{R_r} \cdot \frac{(g_1 - n_1)\omega + (n_3 - g_1 n_2 + g_2 n_1)\omega^3 +}{(1 + n_4\omega^4 - n_2\omega^2)^2 + (n_5\omega^5 - n_3\omega^3 + n_1\omega)^2} \quad (68)$$

Amplitude-frequency response $A_v(\omega)$ can be represented as follows:

$$A_{i-out,v} = \sqrt{a_{i-out,v}^2 + b_{i-out,v}^2} \quad (69)$$

Phase-frequency response $\phi_{iv}(\omega)$ can be represented as follows:

$$\phi_{i-out,v}(\omega) = A\ \text{TAN}\ 2(a_{i-out,v}, b_{i-out,v}) \quad (70)$$

Based on equations (24) and (51), the general dynamic control approach of FIG. 2 results, in which the input current/voltage relationship is given by the following equations (71)-(73):

$$\frac{I_{in}}{V_{in}} = \frac{1}{R_r} \cdot \frac{m_4 p^4 + m_3 p^3 + m_2 p^2 + m_1 p + 1}{n_5 p^5 + n_4 p^4 + n_3 p^3 + n_2 p^2 + n_1 p + 1} \quad (71)$$

$$A_i(\omega) = \quad (72)$$
$$\frac{\sqrt{[1 + (g_1 m_1 - m_2)\omega^2 + (m_4 + g_2 m_2 - g_1 m_3)\omega^4 - g_2 m_4 \omega^6]^2 +}}{[(g_1 m_4 - g_2 m_3)\omega^5 + (m_3 - g_1 m_2 + g_2 m_1)\omega^2]^2}}{(1 + m_4\omega^4 - m_2\omega^2)^2 + (m_3\omega^3 - m_1\omega)^2}$$

$$\frac{1}{A_i(\omega)} = \quad (73)$$
$$\frac{(1 + m_4\omega^4 - m_2\omega^2)^2 + (m_3\omega^3 - m_1\omega)^2}{\sqrt{[1 + (g_1 m_1 - m_2)\omega^2 + (m_4 + g_2 m_2 - g_1 m_2)\omega^4 - g_2 m_4\omega^6]^2 +}}$$
$$[(g_1 m_4 - g_2 m_2)\omega^5 + (m_2 - g_1 m_2 + g_2 m_1)\omega^2]^2$$

Figure 7:
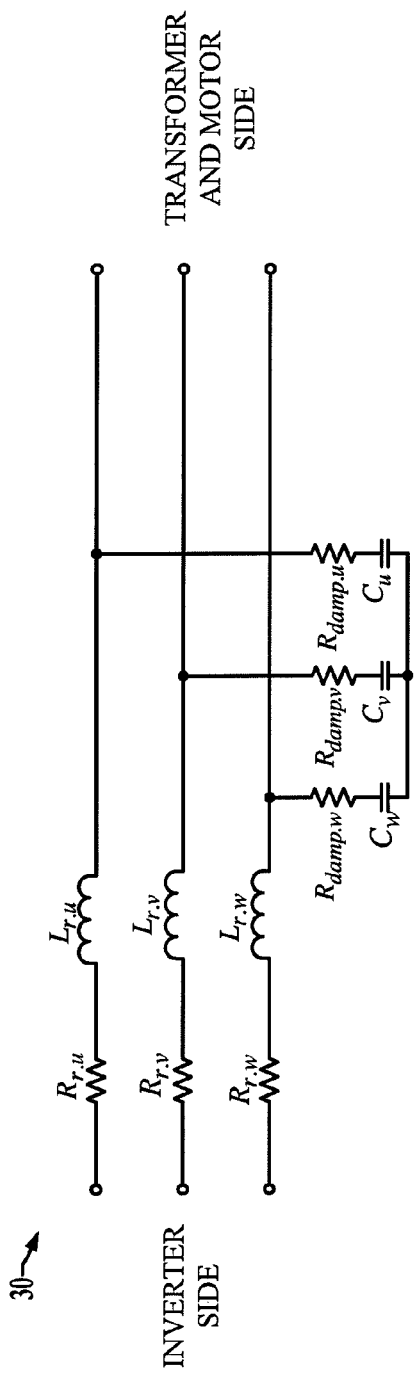
FIG. 7 is a schematic diagram of another example three-phase sine wave output filter with one reactor winding between the inverter and the transformer of FIG. 1.
Figure 8:
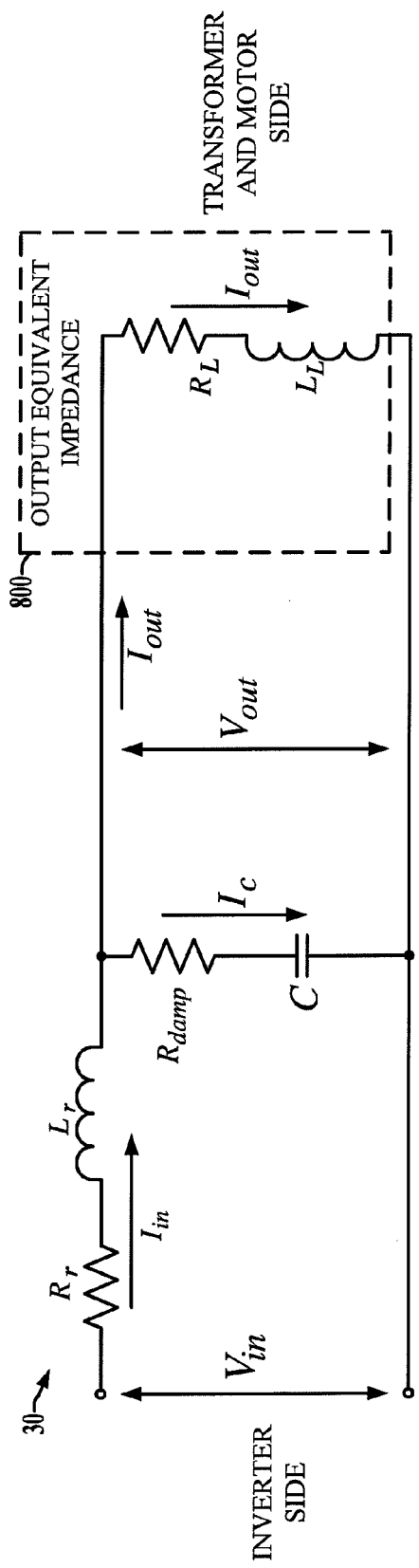
FIG. 8 is a schematic diagram of a single phase equivalent of the filter in FIG. 7 and the impedance components of the load.
Figure 9:
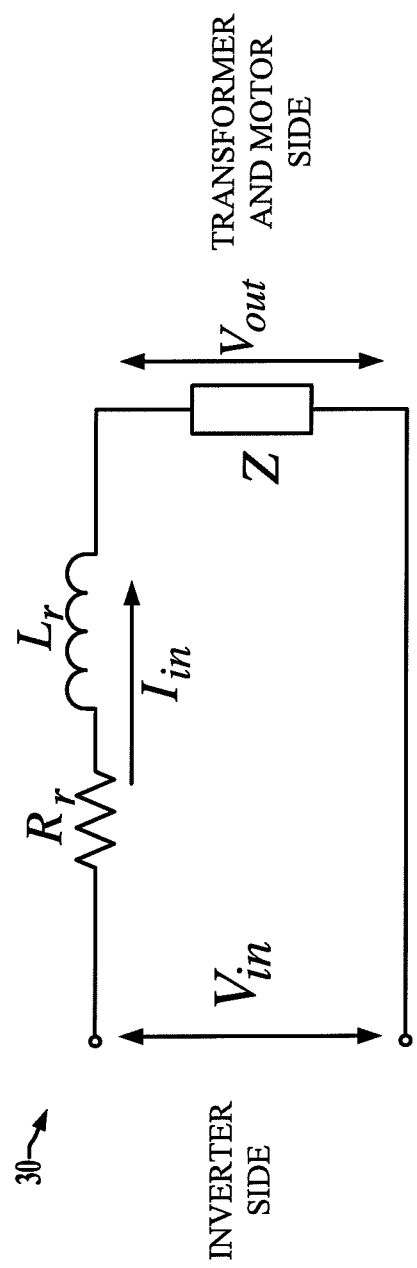
FIG. 9 is a schematic diagram of a reconfiguration of the filter of FIG. 8.

Referring now to FIGS. 7-9, FIG. 7 shows a three-phase schematic of sinewave filter 30 with one reactor winding and damping resistor, FIG. 8 shows a single phase equivalent schematic of the filter of FIG. 7 including an equivalent output impedance circuit 800, and FIG. 9 illustrates a reconfiguration of the filter of FIG. 8. In this example, the resonance frequencies (Hz) for a no load condition can be written according to the following equation (74):

$$f_{res} = \frac{1}{2 \cdot \pi \cdot \sqrt{C \cdot L_r}} \quad (74)$$

The damping factor "$\xi$" for no load condition can be written as follows:

$$\xi = \frac{R_{damp} 1}{2} \cdot \sqrt{\frac{C}{L_r}} \quad (75)$$

In FIG. 8, the impedance component Z is equivalent impedance that includes "$R_L$, $L_L$", capacitor "$C$", and the damping resistor "$R_{damp}$". The impedance Z can be expressed according to the following equation (76):

$$Z = R_L \cdot \frac{(1 + pCR_{damp}) \cdot \left(1 + p\frac{L_L}{R_L}\right)}{L_L C p^2 + (R_L + R_{damp})Cp + 1} \quad (76)$$

Using equation (76), the input current $I_{in}$ can be expressed according to the following equation (77):

$$I_{in} = \frac{V_{in}}{R_r \cdot \left(1 + p\frac{L_r}{R_r}\right) + R_L \cdot \frac{(1 + pCR_{damp}) \cdot \left(1 + p\frac{L_L}{R_L}\right)}{L_L C p^3 + (R_L + R_{damp})Cp + 1}} = \quad (77)$$

$$V_{in} \cdot \frac{L_L C p^2 + (R_L + R_{damp})Cp + 1}{R_r \cdot \left(1 + p\frac{L_r}{R_r}\right) \cdot [L_L C p^2 + (R_L + R_{damp})Cp + 1] +}$$
$$R_L \cdot (1 + pCR_{damp}) \cdot \left(1 + p\frac{L_L}{R_L}\right)$$

The input current can be expressed, following some manipulation, according to the following equations (78) and (79):

$$I_{in} = \frac{V_{in}}{(R_L + R_r)} \cdot \frac{L_L C p^2 + (R_L + R_{damp})Cp + 1}{\frac{L_r}{(R_L + R_r)} \cdot L_L C p^3 + \frac{R_{damp} + R_r}{R_L + R_r} \cdot (L_r + L_L)Cp^2 + \frac{R_L R_r + R_{damp}R_r + R_L R_{damp}}{R_L + R_r}Cp + 1} \quad (78)$$

Or:

$$\frac{I_{in}}{V_{in}} = \frac{1}{(R_L \mid R_r)} \cdot \frac{L_L C p^2 + (R_L + R_{damp})Cp + 1}{\frac{L_r}{(R_L + R_r)} \cdot L_L C p^3 + \frac{R_{damp} + R_r}{R_L + R_r} \cdot (L_r + L_L)Cp^2 + \frac{R_L R_r + R_{damp}R_r + R_L R_{damp}}{R_L + R_r}Cp + 1} \quad (79)$$

The output voltage $V_{out}$ can be expressed according to the following equation (80):

$$V_{out} = Z * I_{in} = R_L \cdot \frac{(1 + pCR_{damp}) \cdot \left(1 + p\frac{L_L}{R_L}\right)}{L_L C p^2 + (R_L + R_{damp})Cp + 1} \cdot \frac{V_{in}}{(R_L + R_r)} \cdot \quad (80)$$

$$\frac{L_L C p^2 + (R_L + R_{damp})Cp + 1}{\frac{L_r}{(R_L + R_r)} \cdot L_L C p^3 + \frac{R_{damp} + R_r}{R_L + R_r}(L_r + L_L)Cp^2 + \frac{R_L R_r + R_{damp}R_r + R_L R_{damp}}{R_L + R_r}Cp + 1}$$

Following some manipulation, the output voltage can be expressed according to the following equations (81) and (82):

$$V_{out} = \quad (81)$$

$$V_{in} \cdot \frac{R_L}{(R_L + R_r)} \cdot \frac{(1 \mid pCR_{damp}) \cdot \left(1 \mid p\frac{L_L}{R_L}\right)}{\frac{L_r}{(R_L + R_r)} \cdot L_L C p^3 + \frac{R_{damp} + R_r}{R_L + R_r}(L_r + L_L)Cp^2 + \frac{R_L R_r + R_{damp}R_r + R_L R_{damp}}{R_L + R_r}Cp + 1}$$

Or:

$$\frac{V_{out}}{V_{in}} = \frac{R_L}{(R_L + R_r)} \cdot \frac{(1 + pCR_{damp}) \cdot \left(1 + p\frac{L_L}{R_L}\right)}{\frac{L_r}{(R_L \mid R_r)} \cdot L_L C p^3 + \frac{R_{damp} + R_r}{R_L \mid R_r} \cdot (L_r + L_L)Cp^2 + \frac{R_L R_r + R_{damp}R_r + R_L R_{damp}}{R_L \mid R_r}Cp + 1} \quad (82)$$

The filter output current $I_{out}$ (FIG. 8) can be expressed according to the following equations (83) and (84):

$$I_{out} = \frac{V_{out}}{R_L \cdot \left(1 + p\frac{L_L}{R_L}\right)} = \quad (83)$$

$$V_{in} \cdot \frac{R_L}{(R_L + R_r)} \cdot \frac{(1 + pCR_{damp}) \cdot \left(1 + p\frac{L_L}{R_L}\right)}{\frac{L_r}{(R_L + R_r)} \cdot L_L C p^3 + \frac{R_{damp} + R_r}{R_L + R_r} \cdot (L_r + L_L)Cp^2 + \frac{R_L R_r + R_{damp}R_r + R_L R_{damp}}{R_L + R_r}Cp + 1} \cdot$$

$$\frac{1}{R_L \cdot \left(1 + p\frac{L_L}{R_L}\right)}$$

Or:

$$\frac{I_{out}}{V_{in}} = \frac{1}{(R_L + R_r)} \cdot \frac{(1 + pCR_{damp})}{\frac{L_r}{(R_L + R_r)} \cdot L_L C p^3 + \frac{R_{damp} \mid R_r}{R_L + R_r} \cdot (L_r + L_L)Cp^2 + \frac{R_L R_r \mid R_{damp}R_r \mid R_L R_{damp}}{R_L + R_r}Cp + 1} \quad (84)$$

From equation (79) the following input voltage equation (85) can be obtained:

$$V_{in} = I_{in} \cdot (R_L \mid R_r) \cdot \frac{L_r}{(R_L \cdot R_r)} \cdot L_L C p^3 + \quad (85)$$

$$\frac{R_{damp} + R_r}{R_L + R_r} \cdot (L_r + L_L)Cp^2 + \frac{R_L R_r + R_{damp}R_r + R_L R_{damp}}{R_L + R_r}Cp + 1$$

$$L_L C p^2 + (R_L + R_{damp})Cp + 1$$

From equations (84) and (85) the following output-input current relationship (86) can be obtained:

$$\frac{I_{out}}{I_{in}} = \frac{1 + pCR_{damp}}{L_L C p^2 + (R_L + R_{damp})Cp + 1} \quad (86)$$

If damping resistor is omitted from the filter 30, the following relationships (87)-(90) are found:

$$\frac{I_{in}}{V_{in}} = \frac{1}{(R_L + R_r)} \cdot \frac{L_L C p^2 + R_L C p + 1}{\frac{L_r}{(R_L + R_r)} \cdot L_L C p^3 + \frac{R_r}{R_L + R_r} \cdot (L_r + L_L)Cp^2 + \frac{R_L R_r}{R_L + R_r}Cp + 1} \quad (87)$$

$$\frac{V_{out}}{V_{in}} = \frac{R_L}{(R_L + R_r)} \cdot \frac{\left(1 + p\frac{L_L}{R_L}\right)}{\frac{L_r}{(R_L + R_r)} \cdot L_L C p^3 + \frac{R_r}{R_L + R_r} \cdot (L_r + L_L)Cp^2 + \frac{R_L R_r}{R_L + R_r}Cp + 1} \quad (88)$$

$$\frac{I_{out}}{V_{in}} = \frac{1}{(R_L + R_r)} \cdot \frac{1}{\frac{L_r}{(R_L + R_r)} \cdot L_L C p^3 \mid \frac{R_r}{R_L + R_r} \cdot (L_r + L_L)Cp^2 + \frac{R_L R_r}{R_L + R_r}Cp + 1} \quad (89)$$

$$\frac{I_{out}}{I_{in}} = \frac{1}{L_L C p^2 + R_L C p + 1} \quad (90)$$

Amplitude-frequency and phase-frequency transfer functions can be obtained for equations (79), (82), (84), and (86). Initially, equation (79) can be rewritten according to the following equation (91):

$$\frac{I_{in}}{V_{in}} = \frac{1}{(R_L + R_r)} \cdot \frac{T_2 p^2 | T_1 p | 1}{K_3 p^3 + K_2 p^2 + K_1 p + 1} \tag{91}$$

Where:

$$T_2 = L_L C, \tag{91}$$

$$T_1 = (R_L + R_{damp})C, \tag{92}$$

$$K_2 = \frac{L_r}{(R_L + R_r)} \cdot L_L C, \tag{93}$$

$$K_2 = \frac{R_{damp} + R_r}{R_L + R_r} \cdot (L_r + L_L)C, \text{ and} \tag{94}$$

$$K_1 = \frac{R_L R_r + R_{damp} R_r + R_L R_{damp}}{R_L + R_r} C \tag{95}$$

Substituting "jω" for the operator "p" in equation (91) and rearranging the terms yields the following input current-input voltage relationship (92):

$$\frac{I_{in(j\omega)}}{V_{in(j\omega)}} = \frac{1}{(R_L + R_r)} \cdot \frac{T_2(j\omega)^2 + T_1(j\omega) + 1}{K_3(j\omega)^3 + K_2(j\omega)^2 + K_1(j\omega) + 1} \tag{92}$$

For the manipulation yields the following equation (93):

$$\frac{I_{in(j\omega)}}{V_{in(j\omega)}} = \frac{1}{(R_L + R_r)} \cdot [\alpha_i(\omega) | jb_i(\omega)] \tag{93}$$

Where:

$$\alpha_i(\omega) = \frac{1}{(R_L + R_r)} \cdot \frac{(T_2 K_2 - T_1 K_3)\omega^4 + (K_1 T_1 - K_2 - T_2)\omega^2 + 1}{(1 - K_2 \omega^3)^3 + \omega^3 (K_3 \omega^2 - K_1)^3} \tag{94}$$

$$b_i(\omega) = \frac{1}{(R_L + R_r)} \cdot \frac{K_3 T_2 \omega^5 | (T_2 K_2 | K_3 \; T_1 K_3) \omega^3 | (T_1 \; K_1) \omega}{(1 - K_2 \omega^2)^2 + \omega^2 (K_3 \omega^2 - K_1)^2} \tag{95}$$

The amplitude-frequency response $A_i(\omega)$ can be represented according to the following equation (96):

$$A_i(\omega) = \sqrt{\alpha_i^2 + b_i^2} = \frac{1}{(R_L + R_r)} \cdot \sqrt{\left[\frac{(T_2 K_2 - T_1 K_3)\omega^4 + (K_1 T_1 - K_2 - T_2)\omega^2 + 1}{(1 - K_2 \omega^2)^2 + \omega^2 (K_3 \omega^2 - K_1)^2}\right]^2 + \left[\frac{-K_3 T_2 \omega^5 + (T_2 K_2 + K_3 - T_1 K_3)\omega^3 + (T_1 - K_1)\omega}{(1 - K_2 \omega^2)^2 + \omega^2 (K_3 \omega^2 - K_1)^2}\right]^2} \tag{96}$$

The phase-frequency response $\phi_i(\omega)$ can be represented as follows:

$$\phi_i(\omega) = A \text{ TAN } 2(a_i, b_i) \tag{97}$$

Figure 10:
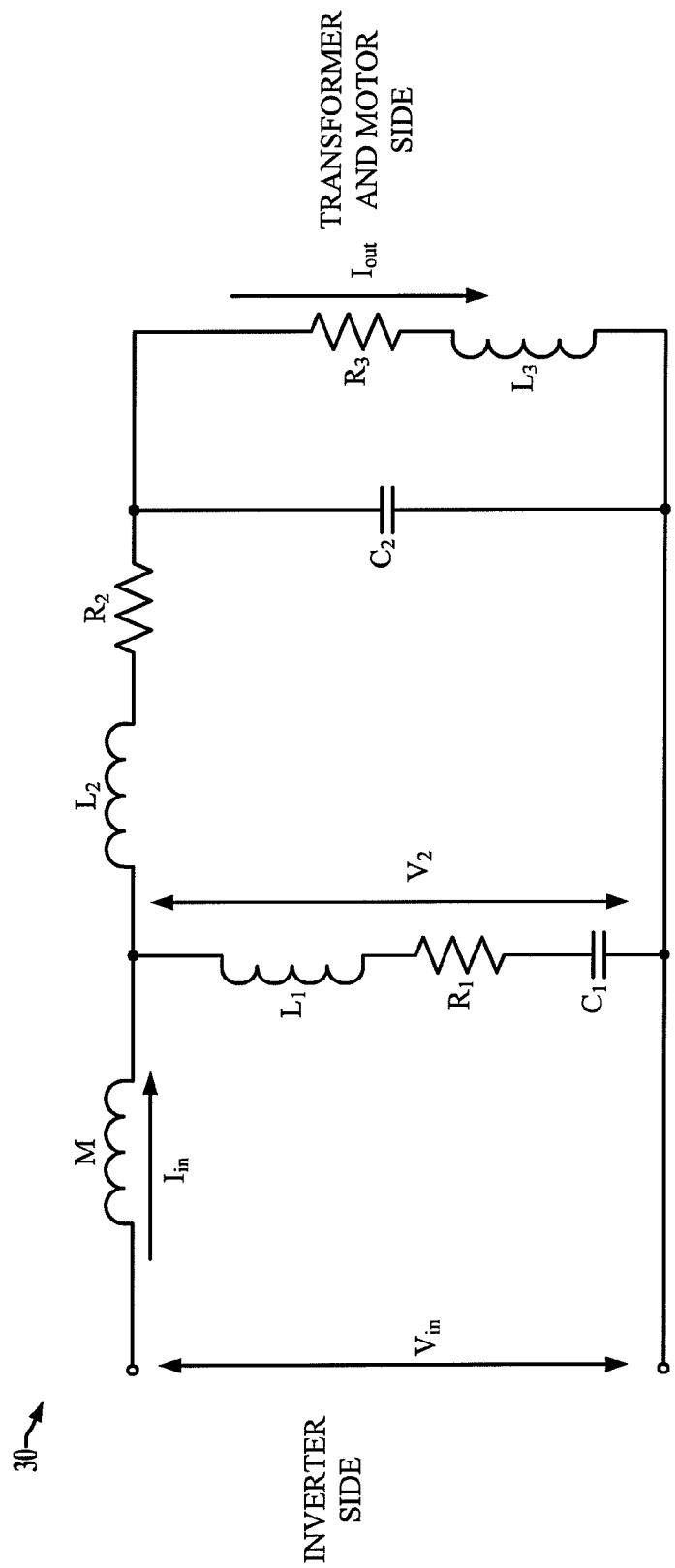
FIG. 10 is a schematic diagram of a third example single phase equivalent output filter with uncoupled parts of mutual inductances.
Figure 11:
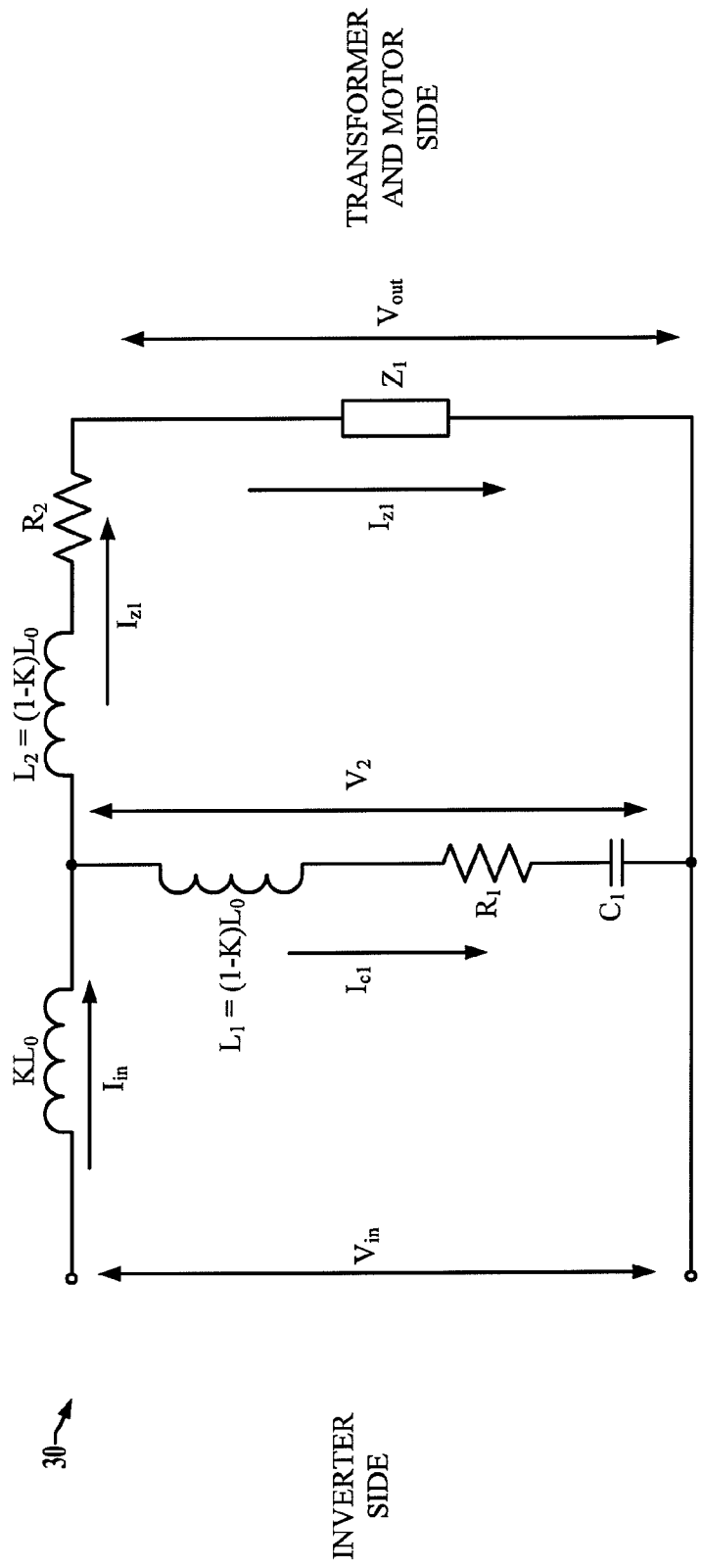
FIG. 11 is a schematic diagram showing an equivalent circuit of the output filter of FIG. 10 including uncoupled parts of mutual inductances.

Referring now to FIGS. 10 and 11, another example output filter circuit 30 is illustrated. In this example, the input-output current vs. frequency transfer function 112 is given according to the following equation (98):

$$A_i(\omega) = \frac{I_{out}(p)}{I_{in}(p)} = \frac{g_2 p^2 + g_1 p + 1}{m_4 p^4 + m_3 p^3 + m_2 p^2 + m_1 p + 1} \tag{98}$$

The second transfer function 114 relating the filter input current to the filter input voltage is given by the following equation (99):

$$\frac{I_{in}(p)}{V_{in}(p)} = \frac{1}{(R_2 + R_3)} * \frac{m_4 p^4 + m_3 p^3 + m_2 p^2 + m_1 p + 1}{n_5 p^5 + n_4 p^4 + n_3 p^3 + n_2 p^2 + n_1 p + 1} \tag{99}$$

Where, $$m_1 = (R_2 + R_3)C_1 + R_1 C_1 + R_3 C_2 \tag{100}$$

$$m_2 = [2(1-K)L_0 + L_3]C_1 + L_3 C_2 + R_3 C_2 * (R_1 + R_2)C_1 \tag{101}$$

$$m_3 = 2(1-K)L_0 C_1 * R_3 C_2 \tag{102}$$

$$m_4 = 2(1-K)L_0 C_1 * L_3 C_2 \tag{103}$$

$$n_1 = R_2 C_2 * \frac{R_3}{R_2 + R_3} + \frac{(1-K)L_0 + L_3}{R_2 + R_3} + R_1 C_1 + \frac{RL_0}{R_2 + R_3} \tag{104}$$

$$n_2 = L_3 C_2 \frac{R_3}{R_2 + R_3} + R_1 C_1 * \left[R_2 C_2 * \frac{R_3}{R_2 + R_3} + \frac{(1-K)L_0 + L_3}{R_2 + R_3}\right] + L_0 C_1 + \frac{RL_0}{R_2 + R_3} * [R_3 C_2 + R_1 C_1] \tag{105}$$

$$n_3 = (1-K)L_0 C_2 * \frac{L_3}{R_2 + R_3} + R_1 C_1 * \left[L_3 C_2 * \frac{R_2}{R_2 + R_3} + \frac{(1-K)R_3}{R_2 + R_3} * L_0 C_2\right] + L_0 C_1 * \left[R_2 C_2 \frac{R_3}{R_2 + R_3} + \frac{(1 \; K^2)L_0 \, | \, L_3}{R_2 + R_3}\right] + \frac{RL_0}{R_2 + R_3} * [R_1 C_1 R_3 C_2 + L_3 C_2] \tag{106}$$

Rearranging yields the following equation (107) for the first transfer function 112:

$$A_i(\omega) \approx \frac{1 - [L_3 * (C_1 + C_2)]\omega^2}{\{1 - [L_3 * (C_1 + C_2)]\omega^2\} + \{[(R_1 + R_2 + R_3)C_1 + R_3 C_2]\omega\}^2} \tag{107}$$

The following equation (108) expresses the second transfer function 114.

$$\frac{I_{in}(p)}{V_{in}(p)} = \frac{1}{(R_2 + R_3)} * \frac{1}{p \frac{L_0 + L_3}{R_2 + R_3} + 1} \tag{108}$$

As discussed above, the first and second transfer functions 112 (equation (107) and 114 (equation (108) can be implemented by the processor 102 in the drive controller 100 in order to provide steady state filter current compensation to drive a motor load 20 through an intervening filter 30. As seen above, the transfer functions 112 and 114 may be expressed in terms of the impedance components of the output filter 30 and the load (e.g., motor load 20 and any intervening transformer 50, cable 60, etc.), and the parameters of equations (107) and (108) can be configured in the memory 104 of the controller 100 in order to adapt a particular motor drive power conversion system 40 for operation in association with a variety of different filter/load combinations.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The following is claimed:

1. A power conversion system, comprising:
   an inverter comprising a DC input, an AC output, and a plurality of switching devices coupled between the DC input and the AC output and operative according to inverter switching control signals to convert DC electrical power received at the DC input to provide AC electrical output power at the AC output to drive a motor load through an intervening output filter; and
   a controller configured to:
   compute a speed error value according to a speed reference value and a speed feedback value using a summing component;
   compute a torque reference value according to the speed error value using a first proportional-integral (PI) control component;
   compute a motor current reference value according to the torque reference value using a lookup table or a parametric equation;
   compensate the motor current reference value according to capacitor currents of the output filter by computing an inverter output current reference value according to the motor current reference value and an inverter operating frequency using a first transfer function representing an output current to input current amplitude vs. frequency behavior of the output filter and the motor load; and
   provide the inverter switching control signals to control the inverter according to the inverter output current reference value;
   wherein the controller is operative to control the inverter according to the inverter output current reference value by:
   computing an inverter output current value according to the inverter output current reference value and an inverter output current value, and
   providing the inverter switching control signals to control the inverter according to the inverter output current value; and
   wherein the controller is operative to estimate the speed feedback value by:
   computing a motor current value according to the inverter output current value and the inverter operating frequency using the first transfer function,
   computing a motor torque value according to the motor current value, and
   computing the speed feedback value according to the motor torque value.

2. The power conversion system of claim 1,
   wherein the controller is operative to control the inverter according to the inverter output current reference value by:
   computing an inverter output voltage control value according to the inverter output current reference value and an inverter output current value, and
   providing the inverter switching control signals to control the inverter according to the inverter output voltage control value.

3. The power conversion system of claim 2, wherein the first transfer function includes parameter values representing impedance components of the output filter and the motor load.

4. The power conversion system of claim 3, wherein the parameter values of the first transfer function are configurable to adapt the power conversion system for different output filters and different motor loads.

5. The power conversion system of claim 1, wherein the first transfer function includes parameter values representing impedance components of the output filter and the motor load.

6. The power conversion system of claim 5, wherein the parameter values of the first transfer function are configurable to adapt the power conversion system for different output filters and different motor loads.

7. A method of operating an inverter to drive a motor load through an intervening filter, the method comprising:
   using at least one processor implementing a summing component, computing a speed error value according to a speed reference value and a speed feedback value;
   using the at least one processor implementing a first proportional-integral (PI) control component, computing a torque reference value according to the speed error value;
   using the at least one processor implementing a lookup table or a parametric equation, computing a motor current reference value according to the torque reference value;
   using the at least one processor, compensating the motor current reference value according to capacitor currents of the output filter by computing an inverter output current reference value according to the motor current reference value and an inverter operating frequency using a first transfer function representing an output current to input current amplitude vs. frequency behavior of the output filter and the motor load;
   using the at least one processor, providing inverter switching control signals to control the inverter according to the inverter output current reference value;
   using the at least one processor, estimating the speed feedback value according to the inverter output current reference value;
   using the at least one processor, computing an inverter output current value according to the inverter output current reference value and an inverter output current value;
   using the at least one processor, providing the inverter switching control signals to control the inverter according to the inverter output current value; and
   using the at least one processor, estimating the speed feedback value by:
   computing a motor current value according to the inverter output current value and the inverter operating frequency using the first transfer function,
   computing a motor torque value according to the motor current value, and computing the speed feedback value according to the motor torque value.

8. The method of claim 7, further comprising:

using at least one processor, computing an inverter output voltage control value according to the inverter output current reference value and an inverter output current value; and using at least one processor, providing the inverter switching control signals to control the inverter according to the inverter output voltage control value.

9. The method of claim 8, wherein the first transfer function includes parameter values representing impedance components of the output filter and the motor load.

10. The method of claim 9, wherein the parameter values of the first transfer function are configurable to adapt the power conversion system for different output filters and different motor loads.

11. The method of claim 7, wherein the first transfer function includes parameter values representing impedance components of the output filter and the motor load.

12. The method of claim 11, wherein the parameter values of the first transfer function are configurable to adapt the power conversion system for different output filters and different motor loads.

13. A non-transitory computer readable medium, comprising instructions that, when executed by at least one processor, cause the at least one processor to:

implement a summing component to compute a speed error value according to a speed reference value and a speed feedback value;

implement a first proportional-integral (PI) control component to compute a torque reference value according to the speed error value;

implement a lookup table or a parametric equation to compute a motor current reference value according to the torque reference value;

compensate the motor current reference value according to capacitor currents of the output filter by computing an inverter output current reference value according to the motor current reference value and an inverter operating frequency using a first transfer function representing an output current to input current amplitude vs. frequency behavior of the output filter and the motor load;

provide the inverter switching control signals to control the inverter according to the inverter output current reference value;

estimate the speed feedback value according to the inverter output current reference value;

compute an inverter output current value according to the inverter output current reference value and an inverter output current value;

provide the inverter switching control signals to control the inverter according to the inverter output current value;

compute a motor current value according to the inverter output current value and the inverter operating frequency using the first transfer function;

compute a motor torque value according to the motor current value; and compute the speed feedback value according to the motor torque value.

14. The non-transitory computer readable medium of claim 13, further comprising instructions that, when executed by at least one processor, cause the at least one processor to:

compute an inverter output voltage control value according to the inverter output current reference value and an inverter output current value;

provide inverter switching control signals to control the inverter according to the inverter output voltage control value;

compute an inverter output current value according to the inverter output voltage control value and the inverter operating frequency using a second transfer function representing an input current to input voltage amplitude vs. frequency behavior of the output filter and the motor load;

compute a motor current value according to the inverter output current value and the inverter operating frequency using the first transfer function;

compute a motor torque value according to the motor current value; and compute the speed feedback value according to the motor torque value.

* * * * *